United States Patent
Kovalenko et al.

(10) Patent No.: US 9,923,202 B2
(45) Date of Patent: Mar. 20, 2018

(54) ANTIMONY BASED ANODE MATERIAL FOR RECHARGEABLE BATTERIES AND PREPARATION METHOD

(71) Applicant: Belenos Clean Power Holding AG, Bienne (CH)

(72) Inventors: Maksym V. Kovalenko, Zurich (CH); He Meng, Dubendorf (CH); Kostiantyn Kravchyk, Zurich (CH); Marc Walter, Kloten (CH)

(73) Assignee: Belenos Clean Power Holding AG, Bienne (CH)

( * ) Notice: Subject to any disclaimer, the term of this patent is extended or adjusted under 35 U.S.C. 154(b) by 0 days.

(21) Appl. No.: 15/428,683

(22) Filed: Feb. 9, 2017

(65) Prior Publication Data

US 2017/0155140 A1    Jun. 1, 2017

Related U.S. Application Data

(62) Division of application No. 14/549,307, filed on Nov. 20, 2014, now Pat. No. 9,634,326.

(30) Foreign Application Priority Data

Nov. 28, 2013   (EP) .................................... 13194946

(51) Int. Cl.
*H01M 10/0525* (2010.01)
*H01M 4/485* (2010.01)
(Continued)

(52) U.S. Cl.
CPC ............ *H01M 4/485* (2013.01); *C01G 19/02* (2013.01); *C01G 30/02* (2013.01); *C01G 51/40* (2013.01);
(Continued)

(58) Field of Classification Search
CPC .......................... H01M 10/0525; H01M 4/134
See application file for complete search history.

(56) References Cited

U.S. PATENT DOCUMENTS

2009/0305135 A1   12/2009   Shi
2012/0125154 A1*  5/2012   Manthiram ............ B82Y 30/00
                                                                75/252

FOREIGN PATENT DOCUMENTS

CN            1728425 A  *  2/2006
WO         2010/0138760       12/2010

OTHER PUBLICATIONS

Yan et al. (Adv. Mater. 2005, 17, 2233-2237).
(Continued)

*Primary Examiner* — Olatunji Godo
(74) *Attorney, Agent, or Firm* — Oblon, McClelland, Maier & Neustadt, L.L.P.

(57) ABSTRACT

An antimony based anode material for a rechargeable battery includes nanoparticles of composition $SbM_xO_y$, where M is an element selected from the group consisting of Sn, Ni, Cu, In, Al, Ge, Pb, Bi, Fe, Co, and Ga, with $0 \leq x < 2$ and $0 \leq y \leq 2.5+2x$. The nanoparticles form a substantially monodisperse ensemble with an average size not exceeding a value of 30 nm and by a size deviation not exceeding 15%. A method for preparing the antimony based anode material is carried out in situ in a non-aqueous solvent and starts by reacting an antimony salt and an organometallic amide reactant and oleylamine.

14 Claims, 17 Drawing Sheets

(51) Int. Cl.
| | |
|---|---|
| H01M 4/525 | (2010.01) |
| H01M 4/56 | (2006.01) |
| H01M 4/36 | (2006.01) |
| H01M 4/134 | (2010.01) |
| H01M 4/38 | (2006.01) |
| H01M 4/131 | (2010.01) |
| H01M 10/054 | (2010.01) |
| H01M 4/04 | (2006.01) |
| C01G 51/00 | (2006.01) |
| C01G 19/02 | (2006.01) |
| C01G 30/02 | (2006.01) |

(52) U.S. Cl.
CPC ......... *H01M 4/0497* (2013.01); *H01M 4/131* (2013.01); *H01M 4/134* (2013.01); *H01M 4/366* (2013.01); *H01M 4/387* (2013.01); *H01M 4/525* (2013.01); *H01M 4/56* (2013.01); *H01M 10/054* (2013.01); *H01M 10/0525* (2013.01); *C01P 2004/04* (2013.01); *C01P 2004/64* (2013.01); *C01P 2006/40* (2013.01)

(56) References Cited

OTHER PUBLICATIONS

Kim et al. (Chem. Mater. 2008, 20, 1679-1681).
Mail et a. (RSC Adv., 2011, 1, 1089-1098).
Henkes et al. (Chem. Mater. 2007, 19, 4234-4242).
European Search Report issued in corresponding application EP 13 19 4946.3, dated Apr. 23, 2014.
Wachtler M. et al., "Anodic Materials for Rechargeable Li-batteries", Journal of Power Sources, Elsevier SA, CH, vol. 105, No. 2, Mar. 20, 2002, pp. 151-160.
Wachtler M. et al., "Tin and tin based intermetallics as new anode materials for lithium-ion cells", Journal of Power Sources, Elsevier SA, CH, vol. 94, No. 2, Mar. 1, 2001, pp. 189-193.
Cabellero et al., "A simple route to high performance nanometric metallic materials for Li-ion batteries involving the use of cellulose: The case of Sb", Journal of Power Sources, Elsevier SA, CH, vol. 175, No. 1, Nov. 26, 2007, pp. 553-557.
Zhang et al., "Lithium insertion/extraction mechanism is alloy anodes for lithium-ion batteries", Journal of Power Sources, Elsevier SA, CH, vol. 196, No. 3, Feb. 1, 2011, pp. 877-885.
Palacin, M. R. Chem. Soc. Rev. 2009, 38, 2565.
Goodenough, J. B.; Kim, Y. Chem. Mater. 2009, 22, 587.
Hayner, C. M.; Zhao, X.; Kung, H. H. Annual Review of Chemical and Biomolecular Engineering 2012, 3, 445.
Park, C.-M.; Kim, J.-H.; Kim, H.; Sohn, H.-J. Chem. Soc. Rev. 2010, 39, 3115.
Zhu, Y.; Han, X.; Xu, Y.; Liu, Y.; Zheng, S.; Xu, K.; Hu, L.; Wang, C. ACS Nano 2013, 7, 6378.
Magasinski, A.; Dixon, P.; Hertzberg, B.; Kvit, A.; Ayala, J.; Yushin, G. Nat. Mater. 2010, 9, 353.
Chockla, A. M.; Klavetter, K. C.; Mullins, C. B.; Korgel, B. A. Chem. Mater. 2012, 24, 3738.
Kovalenko, I.; Zdyrko, B.; Magasinski, A.; Hertzberg, B.; Milicev, Z.; Burtovyy, R.; Luzinov, I.; Yushin, G. Science 2011, 333, 75.
Beattie, S. D.; Larcher, D.; Morcrette, M.; Simon, B.; Tarascon, J. M. Journal of the Electrochemical Society 2008, 155, 158.
Chan, C. K.; Peng, H.; Liu, G.; McIlwrath, K.; Zhang, X. F.; Huggins, R. A.; Cui, Y. Nat. Nanotech. 2008, 3, 31.
Mosby, J. M.; Prieto, A. L. J. Am. Chem. Soc. 2008, 130, 10656.
Alcántara, R.; Jiménez-Mateos, J. M.; Lavela, P.; Tirado, J. L. Electrochemistry Communications 2001, 3, 639.
Klavetter, K. C.; Wood, S. M.; Lin, Y.-M.; Snider, J. L.; Davy, N. C.; Chockla, A. M.; Romanovicz, D. K.; Korgel, B. A.; Lee, J.-W.; Heller, A.; Mullins, C. B. Journal of Power Sources 2013, 238, 123.
Komaba, S.; Matsuura, Y.; Ishikawa, T.; Yabuuchi, N.; Murata, W.; Kuze, S. Electrochemistry Communications 2012, 21, 65.
Ge, P.; Fouletier, M. Solid State Ionics 1988, 28-30, Part 2, 1172.
Cao, Y.; Xiao, L.; Wang, W.; Choi, D.; Nie, Z.; Yu, J.; Saraf, L. V.; Yang, Z.; Liu, J. Adv. Mater. 2011, 23, 3155.
Wang, L.; Lu, Y.; Liu, J.; Xu, M.; Cheng, J.; Zhang, D.; Goodenough, J. B. Angew. Chem. Int. Ed. 2013, 52, 1964.
Park, C.-M.; Yoon, S.; Lee, S.-I.; Kim, J.-H.; Jung, J.-H.; Sohn, H.-J. Journal of the Electrochemical Society 2007, 154, A917.
Caballero, Á.; Morales, J.; Sánchez, L. Journal of Power Sources 2008, 175, 553.
Sung, J. H.; Park, C.-M. J. Electroanal. Chem. 2013, 700, 12.
Park, C.-M.; Sohn, H.-J. Chem. Mater. 2008, 20, 3169.
Darwiche, A.; Marino, C.; Sougrati, M. T.; Fraisse, B.; Stievano, L.; Monconduit, L. J. Am. Chem. Soc. 2013, 135, 10179.
Baggetto, L.; Ganesh, P.; Sun, C.-N.; Meisner, R. A.; Zawodzinkski, T. A.; Veith, G. M. Journal of Materials Chemistry A 2013, 1, 7985.
Qian, J.; Chen, Y.; Wu, L.; Cao, Y.; Ai, X.; Yang, H. Chem. Commun. 2012, 48, 7070.
Zhou, X.; Dai, Z.; Bao, J.; Guo, Y.-G. Journal of Materials Chemistry A 2013, 1, 13727.
Talapin, D. V.; Murray, C. B. Science 2005, 310, 86.
Law, M.; Luther, J. M.; Song, Q.; Hughes, B. K.; Perkins, C. L.; Nozik, A. J. J. Am. Chem. Soc. 2008, 130, 5974.
Zhang, H.; Hu, B.; Sun, L.; Hovden, R.; Wise, F. W.; Muller, D. A.; Robinson, R. D. Nano Lett. 2011, 11, 5356.
Hewitt, K. C.; Beaulieu, L. Y.; Dahn, J. R. Journal of the Electrochemical Society 2001, 148, A402.
Wang, J.; Raistrick, I.D.; Huggins, R. A. Journal of the Electrochemical Society 1986, 133, 457.

\* cited by examiner

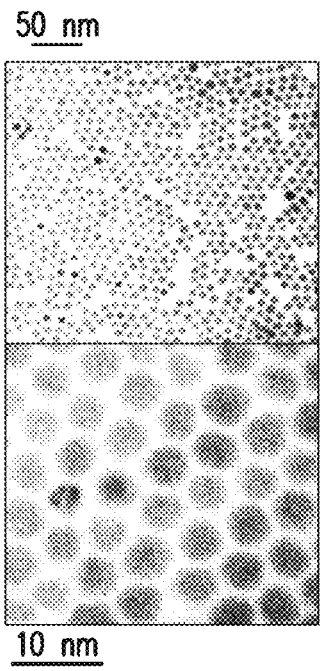 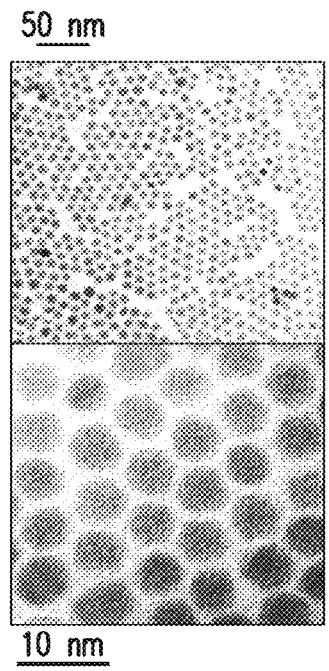
*Fig.5A*  *Fig.5B*
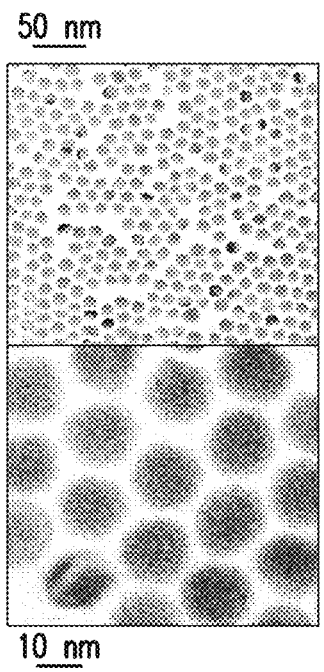 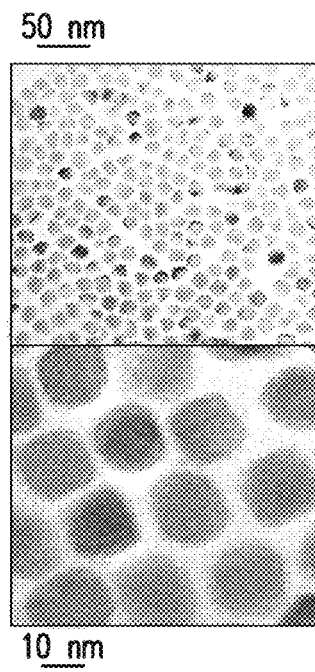
*Fig.5C*  *Fig.5D*

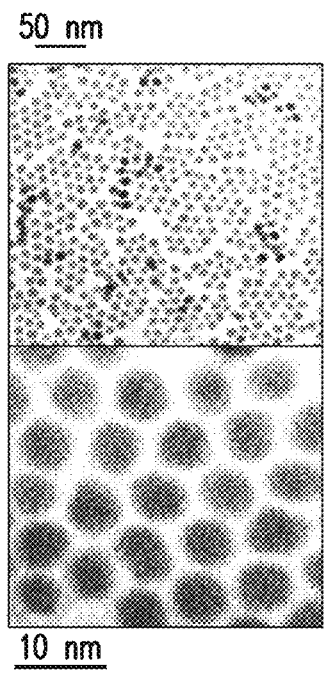 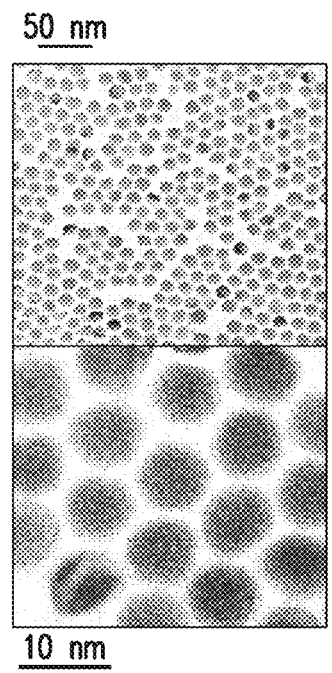
*Fig.6A*  *Fig.6B*
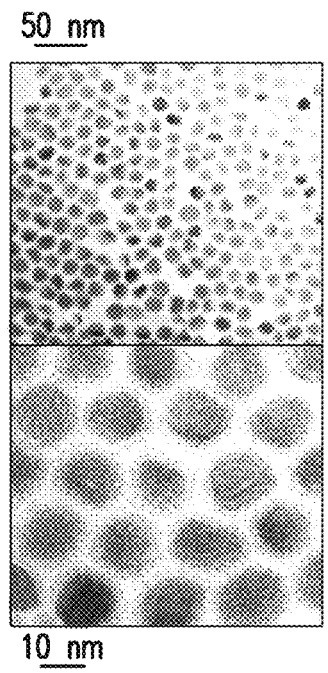 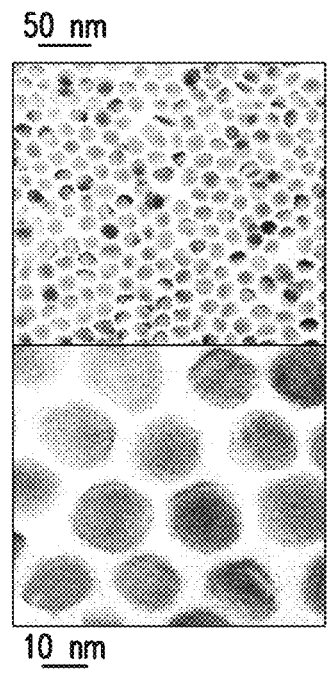
*Fig.6C*  *Fig.6D*

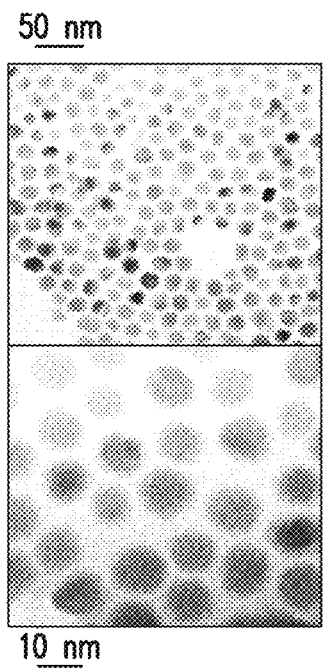 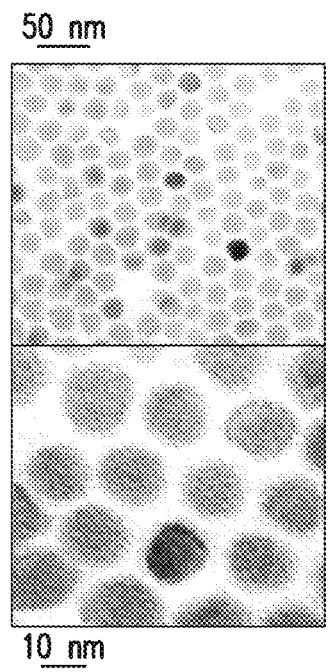
*Fig.7A*  *Fig.7B*
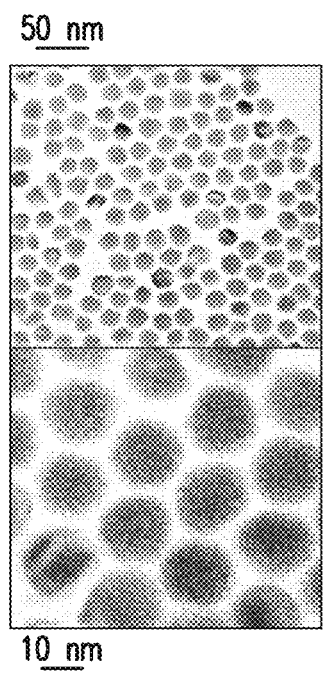 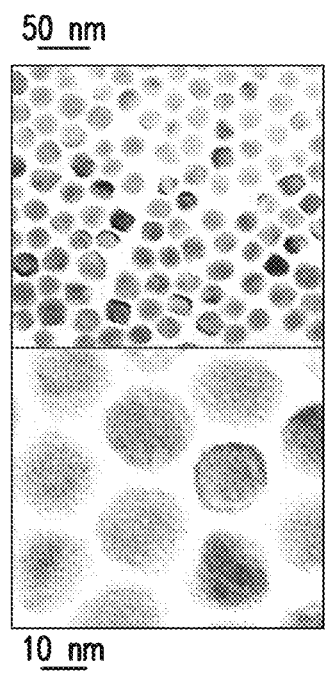
*Fig.7C*  *Fig.7D*

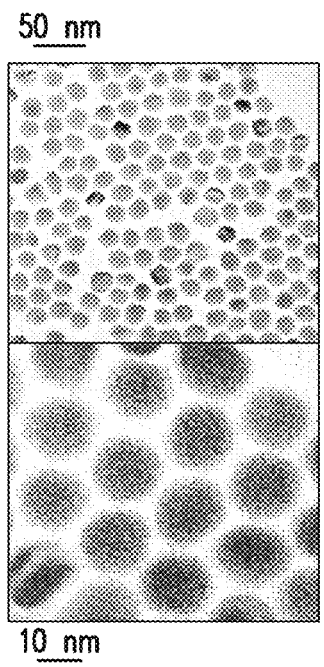 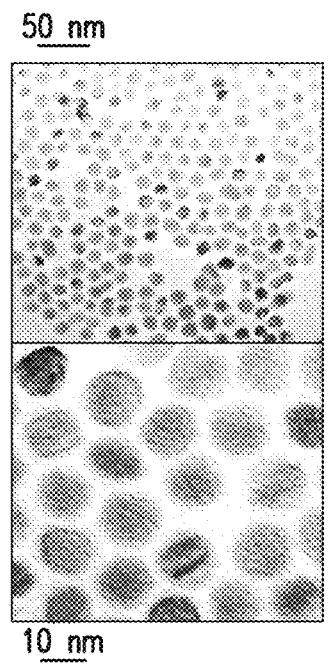
*Fig.8A*  *Fig.8B*
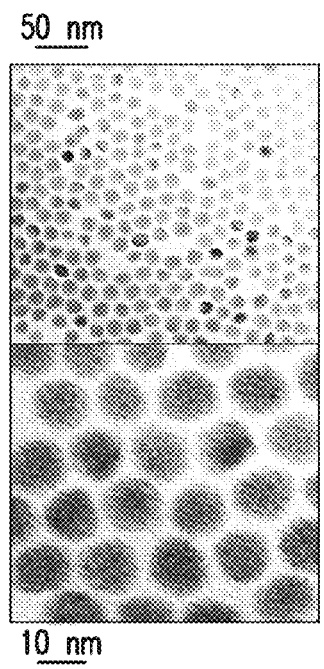 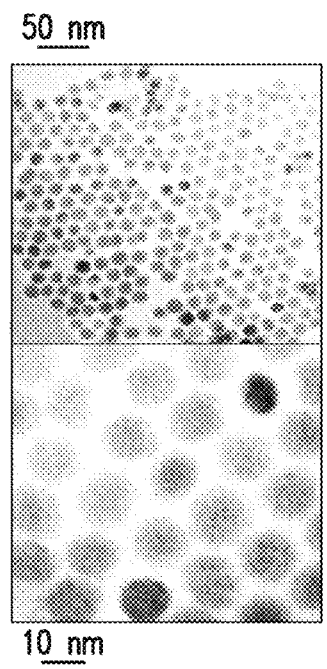
*Fig.8C*  *Fig.8D*

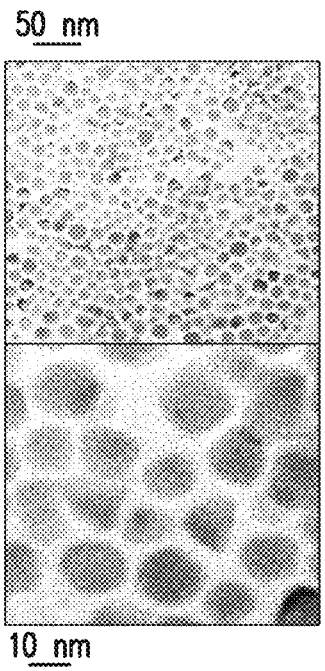 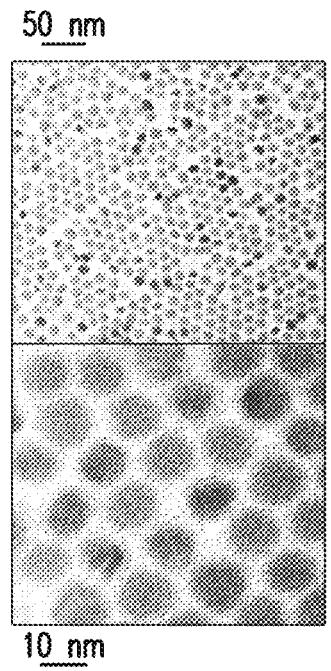
*Fig.11A*  *Fig.11B*
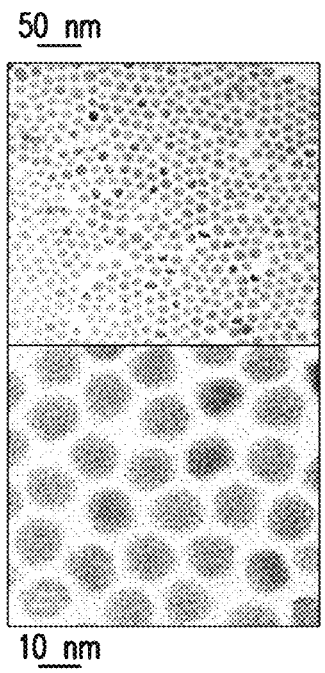 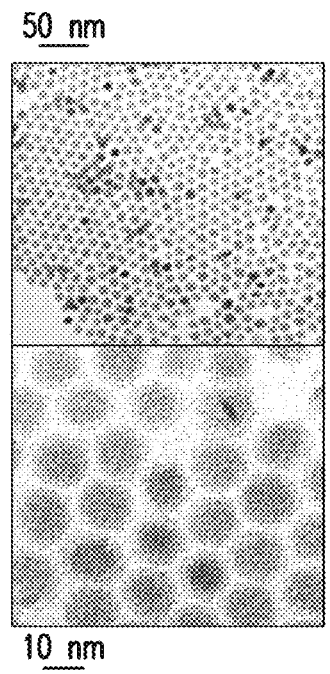
*Fig.11C*  *Fig.11D*

ANTIMONY BASED ANODE MATERIAL FOR RECHARGEABLE BATTERIES AND PREPARATION METHOD

CROSS-REFERENCE TO RELATED APPLICATIONS

This divisional application claims the benefit of priority under 35 U.S.C. § 120 from prior U.S. patent application Ser. No. 14/549,307, filed Nov. 20, 2014, and is based upon and claims the benefit of priority from the prior European Patent Application No. 13194946.3, filed on Nov. 28, 2013. The entire contents of each of these applications are incorporated herein by reference

FIELD OF THE INVENTION

The present invention generally relates to an antimony based anode material for a rechargeable battery, to a method for preparing such material and to a battery, in particular a sodium ion or a lithium ion battery comprising such material.

BACKGROUND OF THE INVENTION

Li-ion batteries (LIBs) remain the most prominent rechargeable, electrochemical energy storage technology [1], with tremendous importance for the portable electronics as well as for rapidly growing sector of environmentally-benign, electrical mobility [2]. A conceptually identical technology, Na-ion batteries (SIBs), is also emerging as a viable alternative due to much greater natural abundance and more even distribution of Na as compared to Li. The particularly strong appeals of commercialized LIBs are their long operation life span, over hundreds to thousands charge/discharge cycles, and superior and broadly tunable balance between the energy density and the power density [3]. This implies, inter alia, that in the search for alternative Li-ion anode materials not only reversible theoretical charge-storage capacities must be higher than that of Graphite (372 mAh g$^{-1}$), but also satisfactory retention of capacity on a long-term and under fast charge/discharge cycling (high current densities) must be obtained. For instance, the transition from commercial graphite anodes to most intensely studied alternatives such as Si, Ge, Sn and some metal oxides, with 2-10 times higher theoretical capacities (with 3579 mAh g$^{-1}$ for Si being the highest) [4] is primarily hampered by the structural instabilities caused by drastic volumetric changes up to 150-300% upon full lithiation to, e.g., Li$_3$Sb, Li$_{15}$Si$_9$, Li$_{15}$Ge$_4$, Li$_{22}$Sn$_5$ [5] or by slow reaction kinetics. Presently, great research efforts are focusing on nanostructuring of the active material, by producing nanowires, nanoparticles and nanocrystals (NPs and NCs), in order to mitigate the effects of volumetric changes and to enhance the lithiation kinetics [6]-[13]. With regard to SIBs, it is important to note an even greater need for efficient anode materials, because silicon does not reversibly store Na-ions at ambient conditions [14], graphite shows negligible capacities of 30-35 mAh g$^{-1}$ [15], while other carbonaceous materials exhibit capacities of less than 300 mAh g$^{-1}$ at rather low current rates and suffer from the low tap density due to high porosity [12]. Contrary to LIBs, there is much greater progress for the Na-ion cathodes than for Na-ion anodes [16], [17].

In the elemental form, antimony (Sb) has long been considered as a promising anode material for high-energy density LIBs due to high theoretical capacity of 660 mAh g$^{-1}$ upon full lithiation to Li$_3$Sb [3], [4], and has gained a revived interest as mechanically-milled or chemically synthesized nanocomposites [18]-[21], as well as in form of bulk microcrystalline or thin-film material [22], [23]. Furthermore, stable and reversible electrochemical alloying of bulk Sb with Na has also been recently demonstrated [22], pointing to the utility of this element in SIBs as well. Several reports, published in 2012-2013, have demonstrated efficient Na-ion storage in Sb/C fibers [5], mechanically milled Sb/C nanocomposites [24], Sb/carbon nanotube nanocomposites [25] and in thin films [23].

Some documents disclose antimony based anode materials for a rechargeable Li-battery which comprise nanoparticles of SnSb (see Wachtler M. et al.: "Anodic materials for rechargeable Li-batteries", Journal of Power Sources, Elsevier SA, CH; vol. 105, no 2, 20 Mar. 2002 (2002-03-20), pages 151-160; or Wachtler M. et al.: "Tin and tin-based intermetallics as new anode materials for lithium-ion cells", Journal of Power Sources, Elsevier SA, CH; vol. 94, no 2, 1 Mar. 2001 (2001-03-01), pages 189-193) or which comprise nanoparticles of Sb (see Caballero et al.: A simple route to high performance nanometric metallic materials for Li-ion batteries involving the use of cellulose: The case of Sb", Journal of Power Sources, Elsevier SA, CH; vol. 175, no 1, 26 Nov. 2007 (2007-11-26), pages 553-557 or Zhang et al.: "Lithium insertion/extraction mechanism in alloy anodes for lithium-ion batteries", Journal of Power Sources, Elsevier SA, CH; vol. 196, no3, 1 Feb. 2011 (2011-02-01), pages 877-885). However, such nanoparticles are obtained by precipitation methods. Such precipitation methods are not able to produce monodisperse nanoparticles or nanocrystals.

SUMMARY OF THE INVENTION

In view of the above, it is an object of the present invention to provide an improved anode material, in particular an antimony based anode material that is better than hitherto known antimony based material and preferably also equal or even better than a tin based anode material.

Further objects of the invention are to provide a method for preparing said improved antimony based anode material and to provide an improved battery like an improved sodium ion battery and in particular an improved lithium ion battery.

These objects and further advantages are achieved by the anode material, the preparation method and the battery as defined in the respective independent claims.

Advantageous embodiments of the invention are defined in the dependent claims and explained in the description.

According to the present invention, there is provided an antimony based anode material for a rechargeable battery, the anode material comprising nanoparticles of composition SbM$_x$O$_y$, wherein M is an element selected from the group consisting of Sn, Ni, Cu, In, Al, Ge, Pb, Bi, Fe, Co, Ga, with 0≤x<2 and 0≤y≤2.5+2x, the nanoparticles forming a substantially monodisperse ensemble with an average size between 5 nm and 30 nm and by a size deviation not exceeding 15%, the nanoparticles optionally being coated with a capping species.

In the present context, the term "substantially monodisperse ensemble of nanoparticles" (or called also monodisperse nanocrystals) shall be understood as a plurality of nanoparticles with a comparatively narrow size distribution that can be expressed in terms of a number density as a function of particle size. According to the invention, the size distribution is characterized by an average size not exceeding a value of 30 nm, preferably comprised between 5 nm and 30 nm, and by a size deviation not exceeding 15%, wherein the size deviation is defined as the full width at half maximum (FWHM) of the size distribution. Such mono disperse nanocrystals are in the form of a powder that is nano, monodisperse and crystalline.

It will be understood that there are various methods for determining size distributions of particle ensembles in the nanometer range. In particular, size distributions may be determined by applying a representative sample of the particles on a suitable substrate, performing transmission electron microscopy (TEM) and carrying out a statistical evaluation of the particle sizes obtained from TEM.

It has been found that a material comprising such a substantially monodisperse ensemble of antimony containing nanoparticles according to the present invention is highly useful to form anodes for a rechargeable battery. It will be understood that actual anodes of such a battery will usually contain the antimony based material and supplementary materials such as carbon particles. However, the material according to the invention is also useful for other applications.

According to one embodiment, the nanoparticles are composed of Sb.

According to another embodiment, the nanoparticles are composed of $SbSn_x$ with $0 \leq x < 2$, in particular $0.1 \leq x < 2$, especially x is about 1.5.

Advantageously, the average size of the nanoparticles is between 5 and 25 nm, preferably between 10 and 25 nm, more preferably between 15 and 25 nm and more preferred about 20 nm.

Also advantageously the FWHM is below 11%, more preferred below 10% and often in a range of 7 to 11% or 7 to 10%.

According to an advantageous embodiment, the capping species is a sulfur containing species, particularly $SH^-$, $SO_4^{2-}$ or $S^{2-}$. This is particularly useful for producing suspensions of capped nanoparticles in polar solvents such as water.

A method for preparing the antimony based anode material according to the present invention comprises the steps of:
a) injecting an antimony precursor in an organic solvent into a solution comprising trioctylphosphine (TOP), organometallic amide like $LiN(iPr)_2$ (LDA), oleylamine (OLA) and optionally a reducing agent like DIBAH and/or an alloying agent,
b) optionally adding an oxidizing agent
c) precipitating the antimony based NPs or NCs
d) optionally decapping the antimony based NPs or NCs.

Step a) may suitably be performed by adding organometallic amide in OLA to TOP, followed by optionally adding a reducing agent prior to adding Sb precursor in an organic solvent. If an alloying agent is present said alloying agent is preferably added prior to the reducing agent.

The above method was found to be suitable for producing an antimony based anode material comprising nanoparticles of composition $SnM_xO_y$ wherein M is an element selected from the group consisting of Sn, Ni, Cu, In, Al, Ge, Pb, Bi, Fe, Co, Ga, with $0 \leq x < 2$ and $0 \leq y \leq 2.5+2x$, the nanoparticles forming a substantially monodisperse ensemble with an average size not exceeding a value of 30 nm and by a size deviation not exceeding 15%, the nanoparticles optionally being coated with a capping species. It was also found that the above defined method leads to formation of antimony containing nanoparticles with a remarkably high shape uniformity. The particles thus formed are all nearly perfectly spherical, or at least have centrosymmetric polyhedral shapes.

The above may be illustrated with the further down following non-limiting example regarding the preparation of Sb nanoparticles. Starting with an antimony precursor such as tris(dimethylamino)antimony(III) [$Sb(NMe_2)_3$ or simply $Sb(DMA)_3$] or antimony trichloride, a conversion into an organometallic antimony amide and reduction step is carried out in-situ by adding a metal amide, OLA and a ligand like trioctylphosphine (TOP). It is assumed that by the addition of a metal amide (such as Li-silylamide, Li-alkylamide etc.) or by in situ formation of an alkali metal alkylamide (such as Li-oleylamide) by a methathesis reaction (e.g. between oleylamide and Li dimethylamide or a similar species), an in situ conversion of the antimony precursor into a antimony amide takes place. In the course of above steps a) to c), it may be necessary to reach temperatures as high as 140° C. or even higher. Accordingly, the selection of useful non-aqueous solvents is generally limited to comparatively high-boiling solvents, i.e. to solvents having a normal boiling point of at least 140° C. or even higher. Suitable examples are toluene, octadecene and oleylamine, with oleylamine, having a normal boiling point of about 364° C. According to another embodiment, the organic, non-aqueous solvent is toluene and/or octadecene.

Preferred antimony precursors that may be used for the above defined method are tris(dimethylamino)antimony(III) [$Sb(NMe_2)_3$ or simply $Sb(DMA)_3$] or antimony trichloride.

Various organometallic amide reactants are expected to be useful for the above defined method. Advantageously, the amide reactant is $LiN(Si(CH_3)_3)_2$, $LiN(CH_3)_2$, lithium diisopropylamide or lithium oleylamide. It has been found that adding an excess of amide reactant, i.e. more than an equimolar amount as compared to the added amount of antimony, e.g. a 10-fold excess, is advantageous.

According to one embodiment, the reducing agent is diisobutylaluminium (DIBAH) or lithium triethylborohydride.

According to another embodiment, the oxidizing agent is oxygen or an oxygen/nitrogen mixture or ozone.

According to a further embodiment, the alloying agent is a chloride, bromide, acetate, triflate or an organic amide of element M.

Following step b), the preparation method is completed by a precipitation step c) yielding a substantially monodisperse nanocrystalline material comprising nanoparticles of composition $SbM_xO_y$. According to an advantageous embodiment, the precipitating agent is an alcohol like ethanol or methanol.

The nanoparticles formed in step c) are formed with an initial capping layer. In general the initial capping layer will comprise weakly bound species stemming from the reaction mixture, e.g. oleylamine and/or oleylamide and, if applicable, other solvent molecules.

Depending on the application of interest, it will often be desirable to either remove the initial capping layer or to replace the initial capping layer by another type of capping molecules. Therefore, the optional process step d) comprises a ligand exchange step to provide an inorganically capped nanocrystalline material or an uncapped nanocrystalline material. The term "ligand exchange step" shall be understood here in broad terms: in order to form an uncapped material, the ligand exchange step may simply refer to direct removal of the initial capping layer or it may involve replacing the initially bound species by some other species that is readily removed thereafter.

Batteries were prepared with antimony anodes of the present invention (10 and 20 nm) and comparative studies encompassing commercial microcrystalline antimony (200 mesh size, e.g. ~75 m particle size, further on also termed "bulk" material) were performed. At moderate current rates of 0.5-1C (1C rate is 660 mA g$^{-1}$), the Li-ion and Na-ion storage capacities of all three sizes was very similar (580-640 mAh g$^{-1}$, lowest for 10 nm Sb in SIBs). The major finding for both LIBs and, even more pronounced, for SIBs is that 20 nm Sb NCs exhibit considerably better overall performance, e.g. capacity/rate capability/cycling stability balance, than both 10 nm Sb NCs and "bulk" Sb. Thus, the general trend is that by reduction of the primary size of Sb to nanomater range such as 20 nm significantly faster kinetics and more stable operation at higher current densities is obtained, while further downsizing to <10 nm seems to be detrimental at least for some applications, as can be seen from the lowering of the charge storage capacity by 5% for for 10 nm Sb NCs in LIBs and up to 20% in NIBs. High rate capability of both 10 and 20 nm Sb NCs is apparent from the retention of up to 80-85% of Li-ion and Na-ion storage capacity upon increase of the current rate up to 20C.

These findings support the benefit of the inventive materials with narrow size distribution that allows the optimization of the amount of particles with desired sizes.

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein are shown:

FIGS. 5A, 5B, 5C, and 5D TEM images of Sb NPs for Sb(DMA)$_3$ based synthesis: time dependent reaction (corresponding to Table 1);

FIGS. 6A, 6B, 6C, and 6D TEM images of Sb NPs for Sb(DMA)$_3$ based synthesis: temperature dependent reaction (corresponding to Table 2);

FIGS. 7A, 7B, 7C, and 7D TEM images of Sb NPs for Sb(DMA)$_3$ based synthesis: different precursor amount (corresponding to Table 3);

FIGS. 8A, 8B, 8C, and 8D TEM images of Sb NPs for Sb(DMA)$_3$ based synthesis: different DIBAH amount (corresponding to Table 4);

FIGS. 11A, 11B, 11C, and 11D TEM images of Sb NPs for SbCl$_3$ based synthesis: different precursor amount. (corresponding to Table 7);

DETAILED DESCRIPTION OF THE INVENTION

Figure 1:
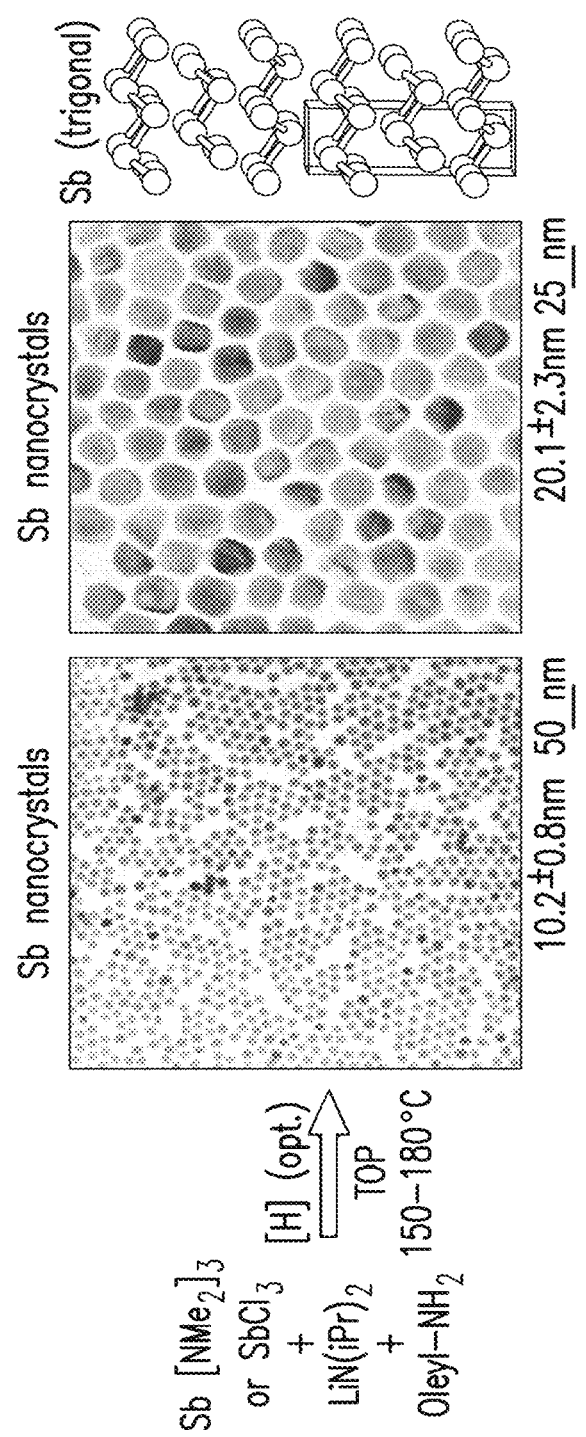
FIG. 1 Schematic illustration of synthesis of Sb NCs with corresponding TEM images and structure.

In the description above and in the following description of the invention and of exemplary embodiments, any statements relating to possible explanations or interpretations of observations and results shall not be construed as binding the invention to a particular theory.

General Procedure:

Synthesis of Monodisperse Sb NCs. 10-20 nm Sb NCs with a narrow size distribution of 7-11® A can be obtained by injecting Sb precursor, diluted with toluene or octadecene, into a hot (preferably 160-200° C.) solution containing mixture of trioctylphosphine (TOP), Lithium diisopropylamide (LiN(iPr)$_2$, LDA) and oleylamine (OLA). Two precursors, tris(dimethylamino)antimony (III) [Sb(NMe$_2$)$_3$ or simply Sb(DMA)$_3$] and inexpensive antimony(III) chloride, yielded NCs of very similar quality under nearly identical reaction conditions. Detailed structural characterization can be made using e.g. high-resolution transmission electron microscopy (HR-TEM), electron diffraction, powder X-ray diffraction (XRD), and energy-dispersive X-ray spectroscopy (EDX). Using these methods, the particles were confirmed to be chemically pure, highly-crystalline rhombohedral Sb NCs (space group N166, R$^{33}$m, a=b=0.4307 nm, c=1.1273 nm, JCPDS 35-0732).

A suitable synthesis for Sn NCs is via formation of amides in-situ, as intermediates during a one-pot synthesis, thereby eliminating their elaborate synthesis and purification, as well as enabling highly unstable amides to be used as precursors. In a first step a neutral amine (OLA, an acid) and an amide base (LiDPA) were mixed in order to establish an acid-base equilibrium due to higher basicity of secondary amide according to

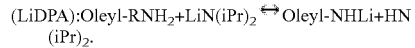
(LiDPA):Oleyl-RNH$_2$+LiN(iPr)$_2$ ⇌ Oleyl-NHLi+HN(iPr)$_2$.

It is assumed that in a second step, transient and unstable Sb(III) oleylamide is formed in-situ by the reaction of Li oleylamide with Sb(DMA)$_3$ or SbCl$_3$. The decomposition of Sb(III)-oleylamide occurs instantly due to known instability of bulky Sb(III) amides. It is assumed that highly unstable transient precursors may in fact be far superior due to enhanced nucleation and growth kinetics controlled by the speed and sequence of the mixing, and through concentrations of starting reagents etc. It was found that in the absence of LiDPA, Sb(DMA)$_3$ and SbCl$_3$ were reduced by OLA much slower, yielding poorly defined, sub-100 nm precipitates. Importantly, the combination of TOP and OLA ligands significantly improved uniformity of the Sb NCs as compared to pure OLA system. In the absence of OLA, the reaction proceeded uncontrollably due to both—the fast formation of highly unstable Sb(III)-DPA species and the lack of stabilization provided by OLA. The size-tuning in 10-20 nm range in $SbCl_3$— and $Sb(DMA)_3$-based systems can be conveniently achieved by varying the reaction time, temperature, precursor amounts and, as an option, by adding diisobutylaluminum hydride (DIBAH) as a reducing agent. It should be noted that addition of DIBAH also allows increase of reaction yield for smallest NCs, from 15% to >30% for 10 nm Sb NCs. In both systems, as the reaction proceeds, nearly spherical 10 nm Sb NCs evolve into more faceted 20 nm-large NCs.

The NCs and NPs can be decapped using solutions of hydrazine in acetonitrile. Briefly, a powder of organic-capped Sb NCs was three times stirred with 1M $N_2H_4$/$CH_3CN$ solution, rinsed with $CH_3CN$. Then the NCs were re-dispersed in water shortly before the preparation of battery anodes. The removal of the initial organic ligands has been estimated by integrating the intensities of aliphatic C—H stretching modes in FTIR spectra and was found to amount to about 93%.

Materials
Chemicals and Solvents:

Cobalt (II) chloride (Aldrich), Oleylamine (OLA, tech., TCI), Toluene (99.9%, Sigma-Aldrich), Toluene dried (≥99.9%, max. 0.005% $H_2O$, VWR Merck), Ethanol (≥99.9%, Scharlau), Oleic acid (OA, 90%, Aldrich), Octadecene (ODE, 90%, Sigma-Aldrich), Antimony (III) chloride ($SbCl_3$, 99.999%, ABCR), lithium diisopropylamide (LiDPA, 97%, Sigma-Aldrich), 1-dodecanethiol (Sigma-Aldrich), Trioctylphosphine (TOP, STREM), Diisobutylaluminum hydride solution (DIBAH, 1M in Toluene, Sigma-Aldrich), Tris(dimethylamino) antimony (III) [$Sb(DMA)_3$, Sigma-Aldrich]. Hydrazine (Gerling Holz+Co), Acetonitrile (Sigma-Aldrich). Dried oleylamine (OLA) and octadecene (ODE) were prepared by drying OLA and ODE at 100° C. under vacuum overnight.

Battery Components:

Antimony (99.5%, Alfa-Aesar), Carbon black (Super C65, provided by TIMCAL), 1 M solution of $LiPF_6$ in ethylene carbonate/dimethyl carbonate (EC/DMC, Novolyte), $NaClO_4$ (98%, Alfa Aesar), propylene carbonate (BASF), ethylene carbonate (Novolyte), Diethyl carbonate (>99%, Aldrich), 4-Fluoro-1,3-dioxolan-2-one (FEC, >98.0%, TCI), Celgard separator (Celgard 2320, 20 μm microporous trilayer membrane (PP/PE/PP), Celgard Inc. USA) and glass-fiber separator (EUJ-grade, Hollingsworth & Vose Company Ltd., United Kingdom), Carboxymethyl cellulose (CMC, Grade: 2200, Lot No. B1118282, Daicel Fine Chem Ltd).

Figure 2A:
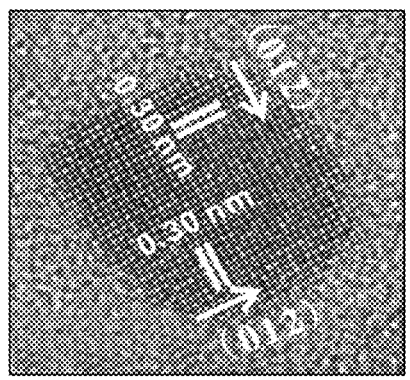
FIG. 2A HRTEM of one Sb NP [viewed along (012) direction]
Figure 2B:
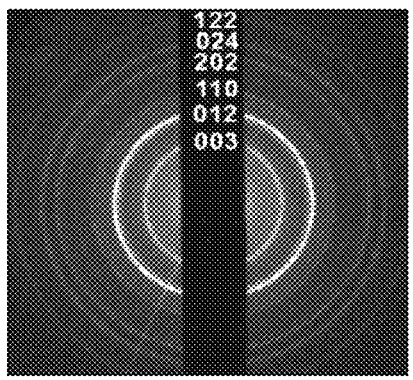
FIG. 2B SAED pattern.
Figure 2C:
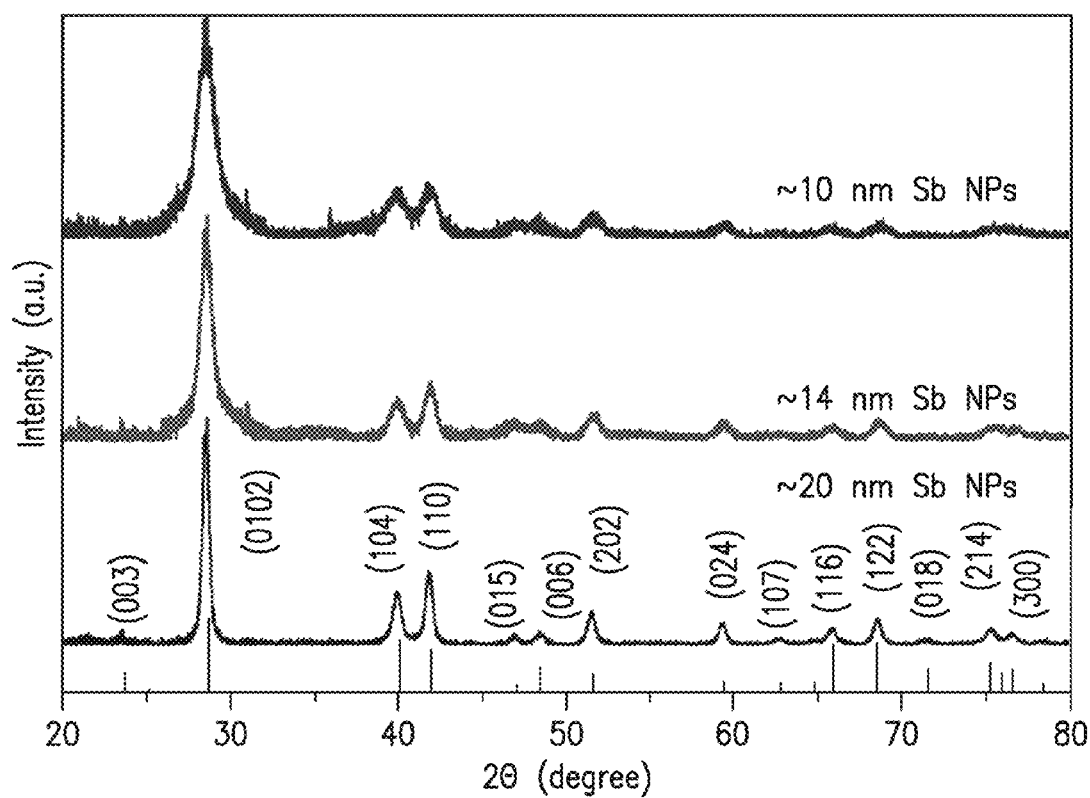
FIG. 2C PXRD pattern of Sb NPs with varying size (10, 14, and 20 nm)

Methods
1. Synthesis of Monodisperse Sb NPs/NCs and SbSn NPs/NCs
1.1 General Information about Synthesis of Monodisperse Sb NCs Monodisperse 10-20 nm Sb NCs (FIG. 1) with standard size distributions of 10% or below were obtained by injecting Sb precursor, diluted with toluene or octadecene, into hot solution containing mixture of trioctylphosphine (TOP), lithium diisopropylamide ($LiN(iPr)_2$, LDA) and oleylamine (OLA). Two precursors, tris(dimethylamino) antimony (III) [$Sb(NMe_2)_3$ or simply $Sb(DMA)3$] and inexpensive antimony(III) chloride, yielded NCs of very similar quality. Detailed structural characterization with high-resolution transmission electron microscopy (TEM), electron and X-ray powder diffraction (FIG. 2) confirmed the formation of chemically pure, highly-crystalline Sb NCs (space group $R\overline{3}m$, a=b=0.4307 nm, c=1.1273 nm, JCPDF 35-0732). FIG. 2C illustrates a single crystalline nature of Sb NCs—a finite size effect on the broadening of XRD reflections.

1.2 Synthesis of Antimony Nanoparticles from $Sb(DMA)_3$ Precursor

In a typical synthesis of 17 nm Sb NPs, 8 mL of Trioctylphosphine (TOP, 8 ml) was added into 50-mL three neck flask and dried under vacuum for 45 minutes at 100° C. under constant stirring. In parallel, LiDPA (3.6 mmol, 0.38 g) and $Sb(DMA)_3$ (0.39 mmol, 75 μL) were separately dissolved under inert atmosphere in 2 mL of dried OLA and ODE, respectively. The temperature of TOP was rised to 170° C. under argon, followed by the injection of LiDPA/OLA solution, and, in 30 s, $Sb(DMA)_3$/ODE solution. The solution color appeared dark brown immediately, indicating the formation of antimony nanocrystals. After 30 seconds, the reaction solution was quickly cooled down to room temperature using water-ice bath. Upon cooling, at about 160° C., 12 ml of anhydrous toluene were added. Then, 0.4 mL of 1-dodecanthiol were added at 50° C. After cooling, Sb NCs were precipitated by 60 mL of ethanol following by their centrifugation at 8500 rpm for 4 min. Then, Sb NCs were redispersed in toluene solution of oleic acid (~6 mL, 1 ml OA/50 ml Toluene) to replace the weakly bonded surface capping ligands. Finally, the Sb NCs were precipitated second time by 6 ml of ethanol, centrifuged and redispersed in common nonpolar solvents such as TCE, chloroform or toluene forming long-term stable solutions.

1.3 Synthesis of Antimony Nanoparticles from $SbCl_3$ Precursor

The synthetic procedure is the same as the procedure for $Sb(DMA)_3$ precursor. For dissolution of $SbCl_3$, dried toluene solution was used instead of ODE.

Figure 3A:
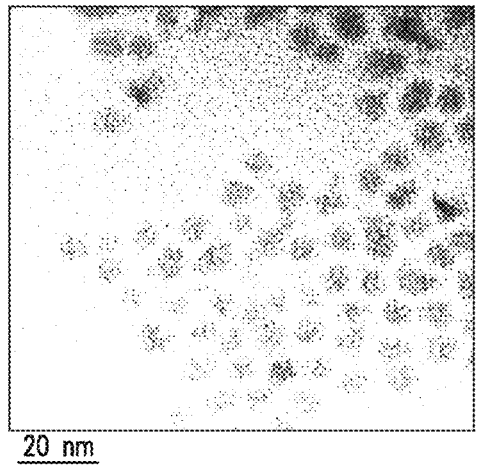
FIGS. 3A and 3B TEM images of Sb NPs synthesized using OLA solvent.
Figure 3B:
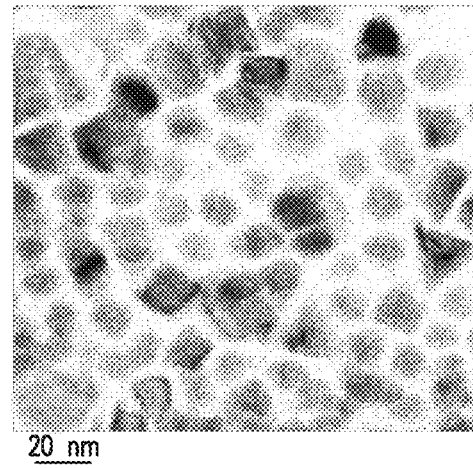

1.4 Further Remarks on the Synthesis (i) Similar results, in terms of the size and quality of Sb NCs, were obtained from the $SbCl_3$ precursor using OLA solvent (FIG. 3).

Figure 4A:
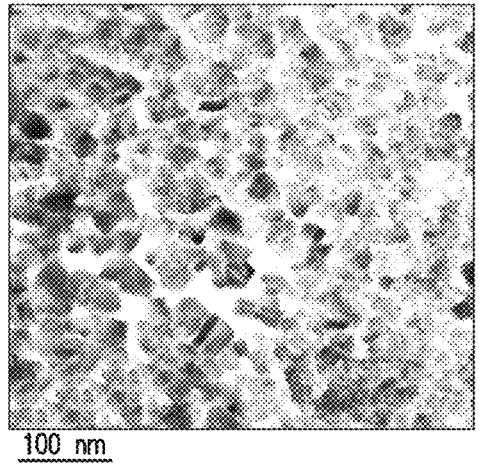
FIG. 4A TEM image of Sb NPs synthesized without LiDPA for Sb(DMA)$_3$ based synthesis.
Figure 4B:
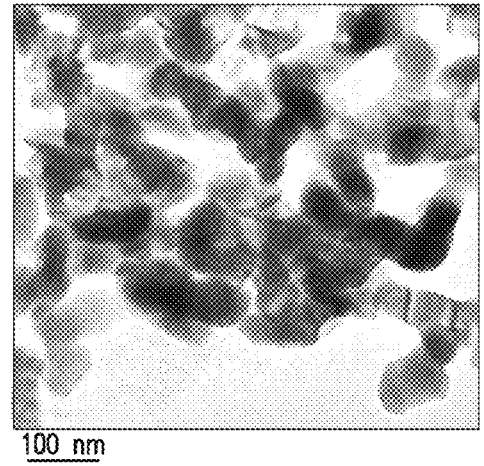
FIG. 4B TEM image of Sb NPs synthesized without LiDPA for SbCl$_3$ based synthesis.

(ii) No NCs could be formed without LiDPA: only polydisperse large particles are formed upon the injecting DIBAH into $SbCl_3$ or $Sb(DMA)_3$-TOP solution directly (FIG. 4).

(iii) Size of Sb NPs synthesized from $Sb(DMA)_3$ precursor can be controlled by the variation of reaction time (Table 1, FIG. 5), temperature (Table 2, FIG. 6), amount of $Sb(DMA)_3$ precursor (Table 3, FIG. 7) or amount of DIBAH (DIBAH have to be added in 30 sec after injection of LiDPA followed by injection of $Sb(DMA)_3$/ODE solution, Table 4, FIG. 8).

Figures 9A, 9B, 9C:
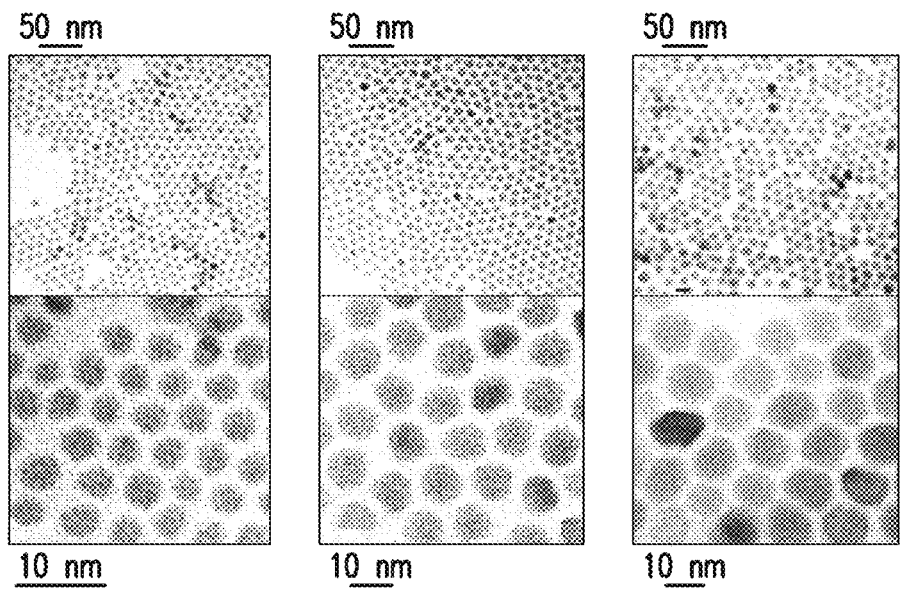
FIGS. 9A, 9B, 9C, 9D, and 9E TEM images of Sb NPs for SbCl$_3$ based synthesis: time dependent reaction (corresponding to Table 5)
Figures 9D, 9E:
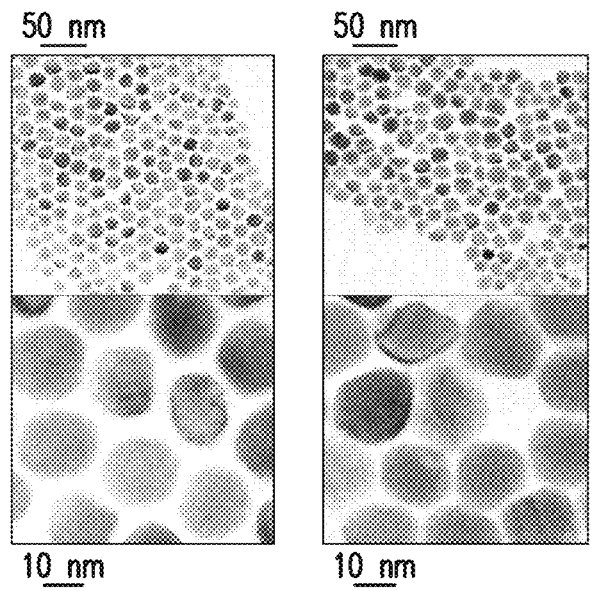
Figures 10A, 10B, 10C:
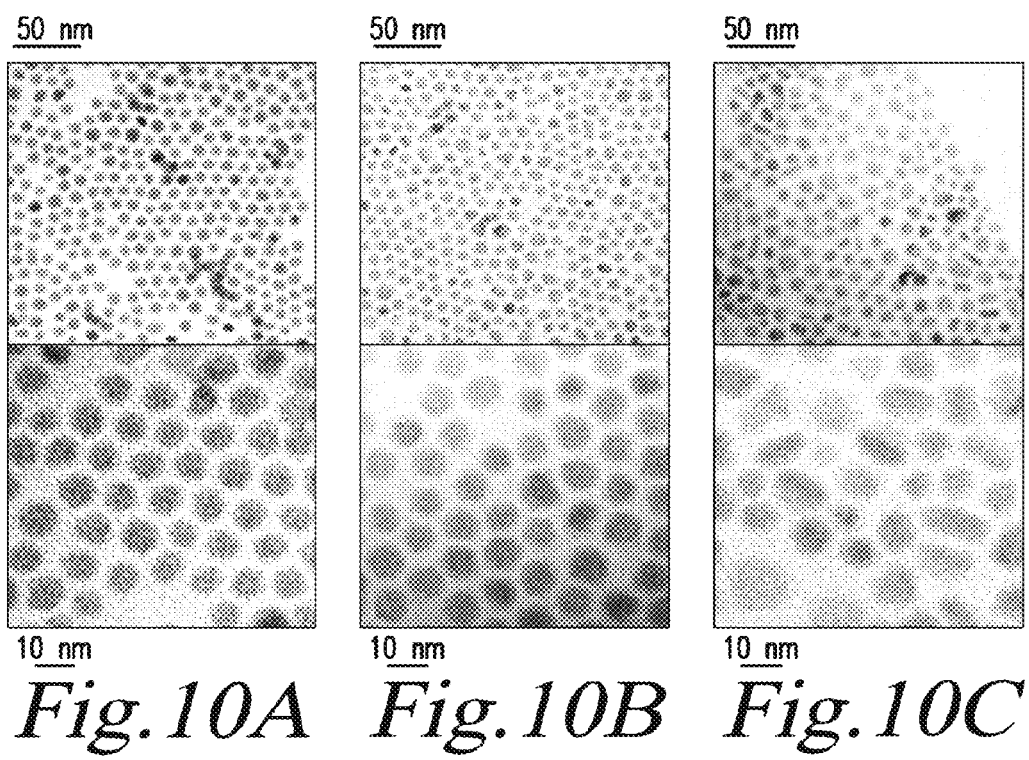
FIGS. 10A, 10B, and 10C TEM images of Sb NPs for SbCl$_3$ based synthesis: temperature dependent reaction. (corresponding to Table 6)

(iv) Size of Sb NPs synthesized from $SbCl_3$ precursor can be controlled by the variation of reaction time (Table 5, FIG. 9), temperature (Table 6, FIG. 10) or different amount of $SbCl_3$ precursor (Table 7, FIG. 11).

(v) As comparative example, the size was measured for commercial Sb: the diameter was 3.97 μm with standard size distribution of 6.3%.

TABLE 1

Experimental conditions for Sb(DMA)₃ based synthesis: time dependent reaction.

| # | TOP, mL | LiDPA(in 2 mL OLA), mmol | Sb(DMA)$_3$, mmol | T(red), °C. | Reaction time, sec | Mean size, nm | S, % |
|---|---|---|---|---|---|---|---|
| A | 8 | 3.6 | 0.39 | 160 | 5  | 10 | 7.8 |
| B | 8 | 3.6 | 0.39 | 160 | 10 | 12 | 8.4 |
| C | 8 | 3.6 | 0.39 | 160 | 30 | 17 | 8.4 |
| D | 8 | 3.6 | 0.39 | 160 | 60 | 19 | 10.1 |

TABLE 2

Experimental conditions for Sb(DMA)₃ based synthesis: temperature dependent reaction.

| # | TOP, mL | LiDPA(in 2 mL OLA), mmol | Sb(DMA)$_3$, mmol | T(red), °C. | Reaction time, sec | Mean size, nm | S, % |
|---|---|---|---|---|---|---|---|
| A | 8 | 3.6 | 0.39 | 150 | 30 | 14 | 8.1 |
| B | 8 | 3.6 | 0.39 | 160 | 30 | 17 | 8.4 |
| C | 8 | 3.6 | 0.39 | 170 | 30 | 18 | 12.1 |
| D | 8 | 3.6 | 0.39 | 180 | 30 | 20 | 11.4 |

TABLE 3

Experimental conditions for Sb(DMA)₃ based synthesis: different precursor amount.

| # | TOP, mL | LiDPA(in 2 mL OLA), mmol | Sb(DMA)$_3$, mmol | T(red), °C. | Reaction time, sec | Mean size, nm | S, % |
|---|---|---|---|---|---|---|---|
| A | 8 | 3.6 | 0.13 | 160 | 30 | 11 | 15.0 |
| B | 8 | 3.6 | 0.26 | 160 | 30 | 16 | 12.8 |
| C | 8 | 3.6 | 0.39 | 160 | 30 | 17 | 8.4 |
| D | 8 | 3.6 | 0.52 | 160 | 30 | 21 | 12.7 |

TABLE 4

Experimental conditions for Sb(DMA)₃ based synthesis: different DIBAH amount.

| # | TOP, mL | LiDPA(in 2 mL OLA), mmol | DIBAH, mL | Sb(DMA)$_3$, mmol | T(red) °C. | Reaction time, sec | Mean size, nm | S, % |
|---|---|---|---|---|---|---|---|---|
| A | 8 | 3.6 | 0   | 0.39 | 160 | 30 | 17 | 8.4 |
| B | 8 | 3.6 | 0.1 | 0.39 | 160 | 30 | 13 | 9.5 |
| C | 8 | 3.6 | 0.2 | 0.39 | 160 | 30 | 12 | 11.5 |
| D | 8 | 3.6 | 0.3 | 0.39 | 160 | 30 | 11 | 9.1 |

TABLE 5

Experimental conditions for SbCl₃ based synthesis: time dependent reaction.

| # | TOP, mL | LiDPA(in 2 mL OLA), mmol | SbCl$_3$, mmol | T(red), °C. | Reaction time, sec | Mean size, nm | S, % |
|---|---|---|---|---|---|---|---|
| A | 8 | 3.6 | 0.125 | 160 | 10 | 8  | 8.9 |
| B | 8 | 3.6 | 0.125 | 160 | 30 | 11 | 8.1 |
| C | 8 | 3.6 | 0.125 | 160 | 45 | 14 | 8.2 |
| D | 8 | 3.6 | 0.125 | 160 | 60 | 18 | 11.8 |

TABLE 6

Experimental conditions for SbCl₃ based synthesis: temperature dependent reaction.

| # | TOP, mL | LiDPA (in 2 mL OLA), mmol | SbCl$_3$, mmol | T(red), °C. | Reaction time, sec | Mean size, nm | S, % |
|---|---|---|---|---|---|---|---|
| A | 8 | 3.6 | 0.125 | 160 | 10 | 8  | 8.9 |
| B | 8 | 3.6 | 0.125 | 180 | 10 | 10 | 12.3 |
| C | 8 | 3.6 | 0.125 | 200 | 10 | 12 | 18.6 |

TABLE 7

Experimental conditions for SbCl₃ based synthesis: different precursor amount.

| # | TOP, mL | LiDPA(in 2 mL OLA), mmol | SbCl$_3$, mmol | T(red), °C. | Reaction time, sec | Mean size, nm | S, % |
|---|---|---|---|---|---|---|---|
| A | 8 | 3.6 | 0.03125 | 160 | 30 | 15 | 16.7 |
| B | 8 | 3.6 | 0.0625  | 160 | 30 | 12 | 11.0 |
| C | 8 | 3.6 | 0.125   | 160 | 30 | 11 | 8.1 |
| D | 8 | 3.6 | 0.1875  | 160 | 30 | 10 | 9.2 |

1.5 Synthesis of SnSb (Sn₃Sb₂) NPs

Figure 12:
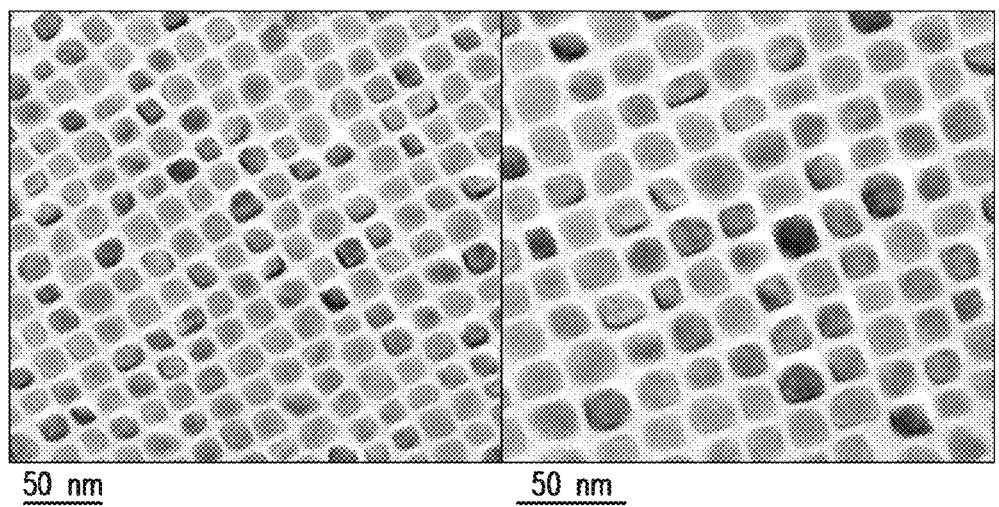
FIG. 12 TEM images of synthesized Sn$_3$Sb$_2$ NPs.

Monodisperse 20 nm SnSb NPs (FIG. 12) with standard size distributions of 10% were obtained by injecting SbCl₃ precursor, diluted with toluene, into hot solution containing mixture of oleylamine (OLA), lithium diisopropylamide (LiN(iPr)₂, LDA) and DIBAH. Based on chemical analysis data, SnSb NCs correspond to the Sn₃Sb₂ composition.

In a typical synthesis of SbSn$_x$ NPs, OLA (10 mL) and SnCl₂ (0.25 mmol, 0.048 g), were added into 50-mL three neck flask and dried under vacuum for 45 minutes at 100° C. under constant stirring. In parallel, LiN(SiMe₃)₂ (3.6 mmol, 0.6 g) and SbCl₃ (0.25 mmol, 0.055 g) were separately dissolved under inert atmosphere in 1 mL of anhydrous toluene. The temperature of $SnCl_2$/OLA was rised to 210° C. under argon, followed by the injection of $Li[N(SiMe_3)_2]$/toluene solution, then 0.6 mL of 1M DIBAH solution, and, finally, $SbCl_3$/toluene solution. After 6 hours, the reaction solution was quickly cooled down to room temperature using water-ice bath. Upon cooling, at about 160° C., 12 ml of anhydrous toluene were added. Then, 0.5 mL of 1-dodecanthiol and 0.5 mL of oleic acid were added after synthesis at 50° C. After cooling, SnSb NCs were precipitated by 60 mL of ethanol followed by their centrifugation at 8500 rpm for 4 min. Then, SnSb NCs were redispersed in toluene solution of oleic acid (~12 mL, 1 ml OA/50 ml Toluene). Finally, the SnSb NCs were precipitated second time by 12 ml of ethanol, centrifuged and redispersed in common nonpolar solvents such as TCE, chloroform or toluene forming long-term stable solutions.

1.6 Ligand Removal

For typical ligand removal procedure, 25 mL of acetonitrile and 0.8 mL of hydrazine were mixed with Sb or SnSb NPs which were collected after their precipitation and centrifugation. The mixture was stirred for 2 h at room temperature and then centrifuged at 8000 rpm for 4 min. Then, 20 mL of acetonitrile were mixed with precipitated Sb or SnSb NPs, in order to remove excess of hydrazine and centrifuged at 8000 rpm for 4 min. This procedure was repeated three times. Finally, centrifuged Sb or SnSb NPs were dried under vacuum at room temperature for 12 h.

1.7 Characterization

Transmission Electron Microscopy (TEM) images were obtained with Philips CM30 TEM microscope at a voltage of 300 kV. Carbon-coated TEM grids from Ted-Pella were used as substrates. Aberration-corrected HD-2700CS (Hitachi; cold-field emitter) at a voltage of 200 kV were used for Scanning transmission electron microscopy (STEM) investigations. Wide-angle powder X-ray diffraction (XRD) spectra were collected on STOE STADI P powder X-ray difractometer.

Size of NCs was determined by PEBBLES software in automatic mode for at least 100 NCs per each sample. Size deviations of NCs were calculated via formula (1) using Gaussian fit of measured NCs, $$S = \frac{FWHM}{2d} * 100\%, \quad (1)$$

where FWHM is fullwidth at half maximum of the Gaussian fit; d is diameter of NCs at maximum of the Gaussian fit.

The tin and antimony content of $SbSn_x$ was determined by d induced coupled plasma (ICP) spectroscopy. Two ICP measurements of two samples independently gave a ratio of Sb to Sn of 1:1.5.

1.8 Synthesis of CoSb NPs

Figure 15:
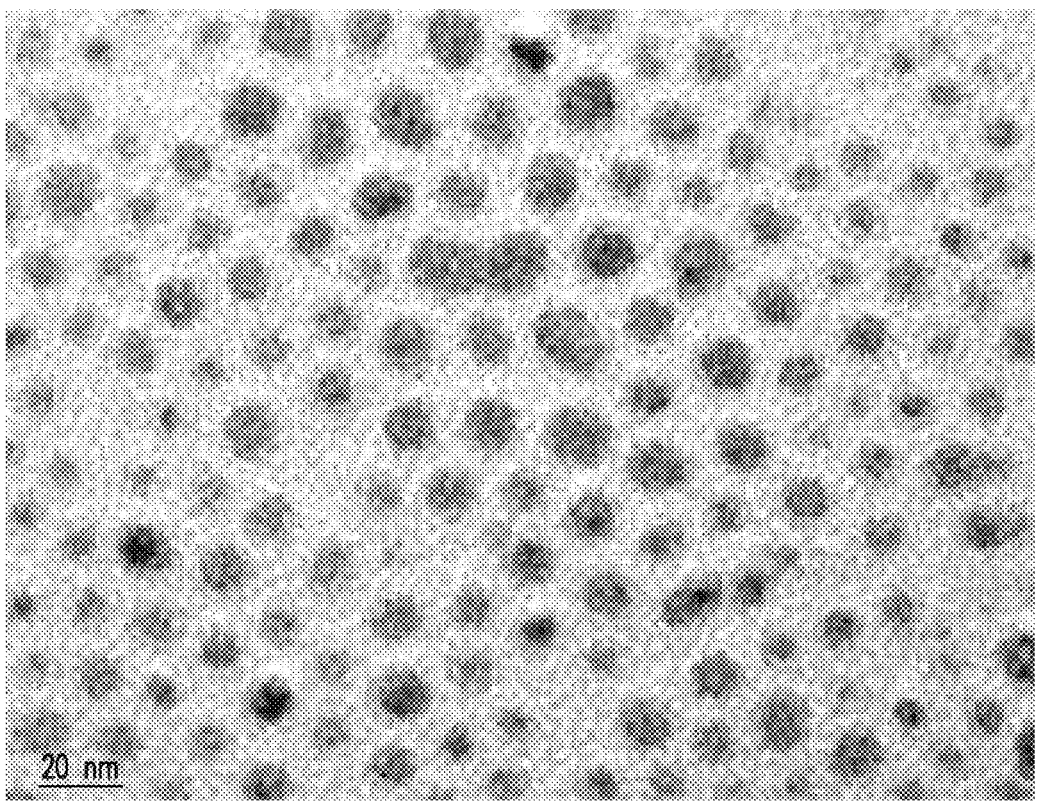
FIG. 15 TEM image of synthesized CoSb NPs.

In a typical synthesis of monodisperse 7.3 nm CoSb NCs (FIG. 15) with standard size distribution of 14.9%, dried OLA (13 mL) was mixed with of $CoCl_2$ (0.065 g, 0.5 mmol) in a 50-mL three neck flask, additionally dried under vacuum (45 minutes at 120° C.), heated to 270° C. under nitrogen, followed by the injection of $LiN(iPr)_2$ solution (3.6 mmol, i.e. ~0.38 g, in 2 mL of OLA) and, after 30 s, 0.5 mmol of $SbCl_3$ (0.114 g, in 0.2 mL of toluene and 0.8 mL of ODE). The reaction was held for 16 h. Finally, the reaction was quickly quenched by cooling with an ice-water bath together with the injection of anhydrous toluene (12 mL) at around 150° C. Upon cooling, oleic acid (~0.4 mL) was added at around 50° C. After cooling, CoSb NCs were precipitated by adding ethanol (~60 mL), followed by centrifugation at 8500 rpm for 4 min. Then CoSb NCs were redispersed in toluene (12 mL) containing oleic acid (~0.25 mL), and then precipitated by ethanol (12 mL) and centrifuged at 8000 rpm for 1 min. Finally, CoSb NCs were dispersed in common nonpolar solvents such as chloroform or toluene and stored in the fridge.

Based on chemical analysis data, CoSb NCs correspond to a ratio of Co:Sb of 1:1.08.

2. Preparation of Sb or SnSb-Based Electrodes and Electrochemical Testing.

2.1 Introduction

Since the rate-performance is a complex function of the electrode formulation (chemistry and amounts of binder and conductive additive), porosity, electrode thickness, electrolyte, temperature etc. these parameters were kept identical and unchanged for all cells in the experiments performed, allowing to focus on the lithiation and sodiation kinetics instrinsic to the electrode material.

There are several factors which are most plausible contributors to the fast alkali-ion insertion and extraction in Sb electrodes. First, the layered crystal structure of Sb (FIG. 1) with low atomic packing factor of just 39% [4] allows for a fast diffusion of Li and Na ions, while electronic conductivity is sufficiently high due to semimetallic nature of this element.

Second reason lies in the chemical transformation occurring during the insertion and extraction of alkali metal ions. While Sn shows up to 6 intermediate crystalline phases, pure Sb as electrode and using in-situ XRD pointed to only one intermediate crystalline phase ($Li_2Sb$) upon lithiation, while de-lithiation is likely to proceed directly from $Li_3Sb$ towards crystalline Sb [29], [30]. For Na-(de)insertion, only one crystalline phase, $Na_3Sb$ (mixture of cubic and hexagonal) has been reported [22].

Li-ion data for 20 nm and bulk Sb closely resembled the data from literature, namely two main peaks at 0.88V and 0.84V corresponding to the two-step lithiation (via $Li_2Sb$), while the main de-lithiation feature is located at 1.05V. Partial amorphization of $Li_3Sb$ during Li-insertion can possibly take place, as suggested by the third, weak feature at 0.75V for bulk Sb and by an overall merging of both peaks into a continuous wave for 20 nm Sb. Na-ion data for bulk Sb fully reproduced the work of Darwiche et al. [22], who also for the first time correlated electrochemical data with in-situ XRD for Na-ion cells with bulk Sb electrodes. Three well separated Na-ion insertion features at 0.3-0.75 V may be correlated to the following sequence of transitions

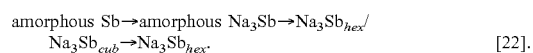

amorphous Sb→amorphous $Na_3Sb$→$Na_3Sb_{hex}$/$Na_3Sb_{cub}$→$Na_3Sb_{hex}$. [22].

De-insertion primarily occurs as $Na_3Sb_{hex}$→amorphous Sb transition (peak at 0.8V), with the additional broad feature at ca. 0.88V, which may correspond to partial crystallization of Sb.

Cycling Stability:

While in Li-ion cells excellent cycling stabilities with capacities above 600 mAh $g^{-1}$ (e.g. 90% or more of theoretical) at 0.5 and 1C-rates were observed for all Sb-electrodes, a clear difference is observed at 4C-rate, at which nanoscopic Sb remains stable, while the capacity of bulk Sb quickly fades. A consistently higher performance of 20 nm Sb NCs was found as compared to 10 nm and bulk Sb, in both Li-ion and Na-ion cells. The difference between 10 nm and 20 nm Sb NCs is most pronounced for Na-cells, where 10-20% lower charge storage capacities are seen at all cycling rates. This difference might be explained by instabilities caused by large proportion of the surface atoms for 10 nm or smaller particles.

Volumetric changes are generally considered as a major problem for obtaining stable cycling in alloying anode materials. These values can be estimated from the difference of the molar volumes (% $V_m$) between the final ($Li_xM$) and initial metallic (M) phases: % V=100%[$V_m(Li_xM)$−$V_m(M)$]/$V_m(M)$. In the case of Sb, much smaller increase of volume by only 135% (meaning that the final volume is 2.35 times greater), upon full lithiation is expected, as compared to Si (310%) and Sn (260%), and may indeed explain much greater cycling stability of Li-ion cells. At the same time, much greater % V of 290% is expected for Na-ion cells upon sodiation to hexagonal $Na_3Sb$ [22]. Despite much greater volumetric changes, electrochemical cycling with Na-ions involves only one crystalline ($Na_3Sb$) and several amorphous phases, including Sb (contrary to Li-ion cells!). More isotropic expansion/contraction of amorphous phases can reduce the amount of anisotropic mechanical stress [23]. Furthermore, a thinner or more stable solid-electrolyte interface (SEI) layer may be formed in Na-ion cells.

2.2 Electrode Preparation and Measurement Set-Up

In a typical electrode preparation, Carbon black, CMC binder and dried Sb or SnSb NCs were ball-milled for 1 h. Obtained homogeneous suspension was pasted on Ti current collector (13 mm diameter) to provide load of approximately 3 mg/cm². All electrochemical measurements were conducted in homemade, reusable and air-tight coin-type cells. Test cells were assembled in an argon-filled glovebox with water and oxygen content below 1 ppm. Lithium or sodium metals were used as both reference and counter electrodes. An active electrode was covered with Celgard separator membrane and a glass fiber separator of 1 mm thickness was placed between working and reference electrode. As an electrolyte, mixture of ethylene carbonate and dimethyl carbonate 1:1 (w/w), with 1M $LiPF_6$ was used for Li-ion batteries and 1 M $NaClO_4$ in propylene carbonate for Na-ion batteries. Additionally, 3% flouroethylene carbonate (FEC) was added to improve cycling stability. All charge-discharge galvanostatic tests and cyclic voltammetry scans were conducted on MPG2 multi-channel workstation (Bio Logic).

2.3 Electrochemical Results

Electrochemical behavior of Sb NPs of different sizes was tested using CMC binder and carbon black as additives (63.75 wt % of Sb, 21.25 wt % of CB and 15 wt % of CMC). The same composition was used for anodes based on SnSb NPs and commercial Sb NPs. All synthesized Sb or SnSb NPs were treated with hydrazine as described above. For better cyclic stability, fluoroethylene carbonate (FEC) was used as a electrolyte additive in all prepared batteries. In order to improve cyclic stability, in this work we used high content of binder and carbon black what allows partially decrease mechanical deformation of Sb or SnSb NPs caused by huge volume changes during lithiation and delithiation processes.

All batteries were cycles in the 20 mV-1.5V potential range. The obtained capacities were normalized by the mass of Sb or SnSb, not taking into account the mass of carbon black which also can be considered as an active material in this potential range.

Li-Ion Batteries

Figure 13A:
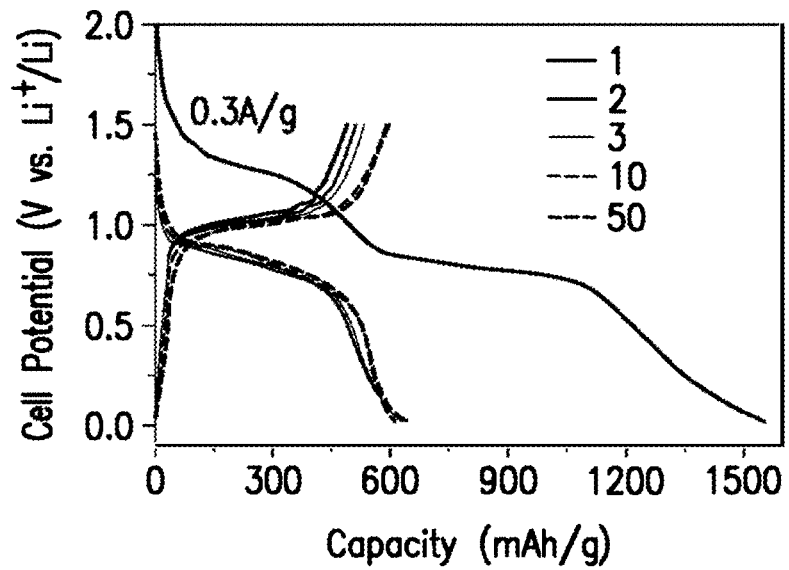
FIG. 13A Galvanostatic discharge profiles for 10 nm Sb anodes.
Figure 13B:
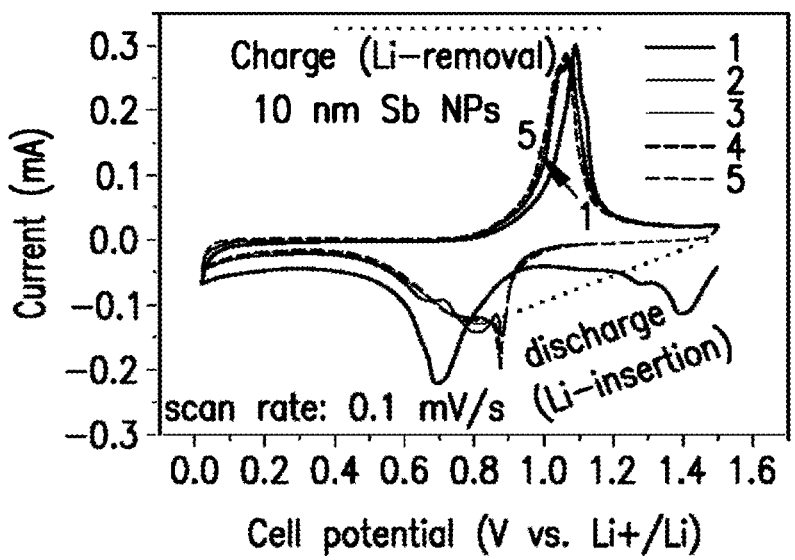
FIG. 13B CVs for the initial five charge-discharge cycles for electrode containing 10 nm Sb NPs (scan rate=0.1V/s)

FIG. 13A shows discharge-charges curves of Sb based anodes obtained by galvanostatic cycling. The first charge and discharge capacity were 1400 and 600 mAh/g, respectively, which correspond to 43% of initial Coulombic efficiently. Such low efficiently could be related to the formation of large amount of SEI coursed by small size of Sb NPs and their partial oxidation. Namely, first discharge plateau at 1.4-1.2V is related to irreversible the formation of SEI. Cyclic voltammetry measurements have shown that formation of SEI takes place indeed at 1.4V (FIG. 13B). Formation of Sb from oxide and all litigation steps take place at 0.5-0.9 V following by delithiation at 1.1V. The second and the following discharge cycles have shown separation of two lithiation processes, with formation of two different phases at 0.9 and 0.8V, respectively. At these potentials, these phases can be assigned to the formation of $Li_2Sb$ and $Li_3Sb$ alloys. Delithiation process takes place in one step with formation of Sb NPs. Thus, lithiation and dilithation processes of Sb NPs after first cycle can be described using the following questions:

$$Sb+2Li \rightarrow Li_2Sb \quad (1)$$

$$Li_2Sb+Li \rightarrow Li_3Sb \quad (2)$$

Figure 13C:
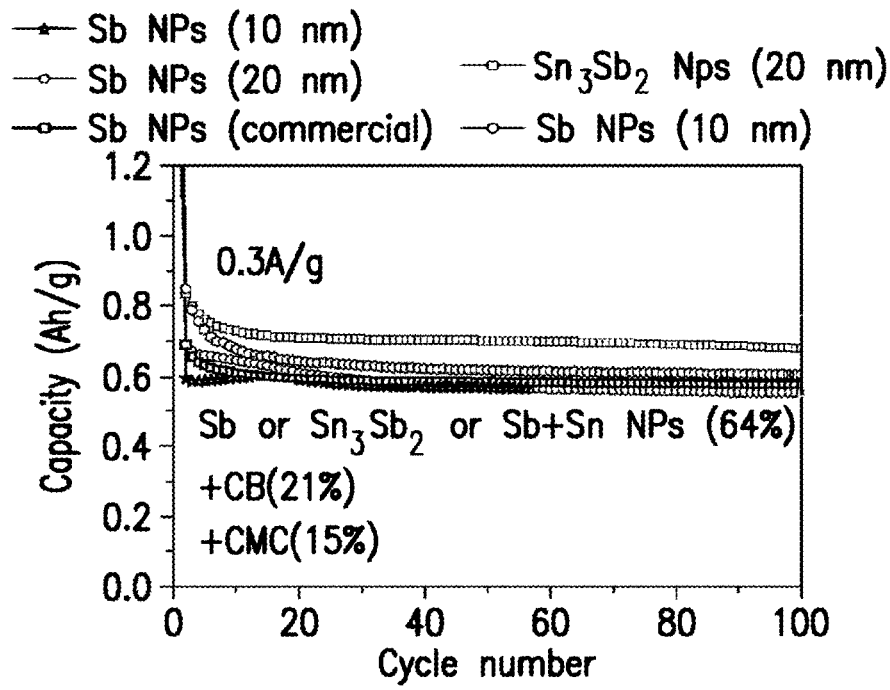
FIGS. 13C, 13D, and 13E Reversible discharge capacities of Sb and Sn$_3$Sb$_2$ based anodes (normalized by the content of Sb or SnSb) at different current densities (0.3, 4.8 and 12.2 A/g)
Figure 13D:
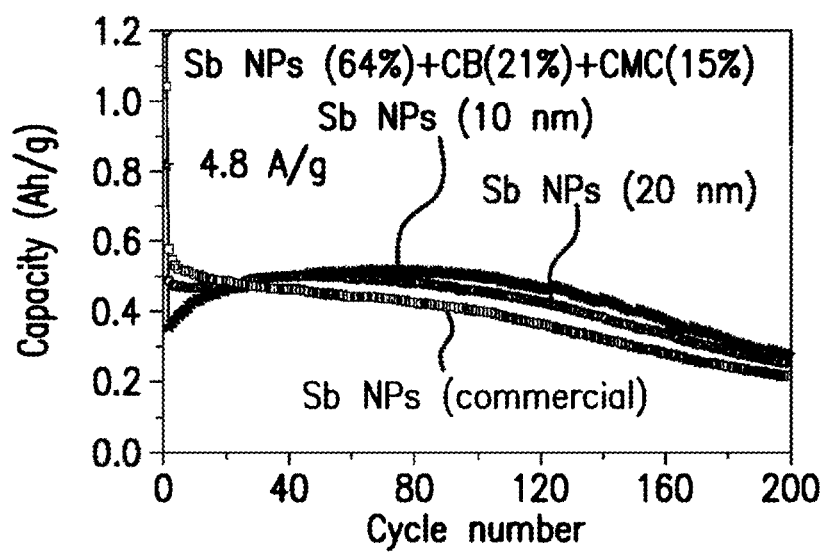
Figure 13E:
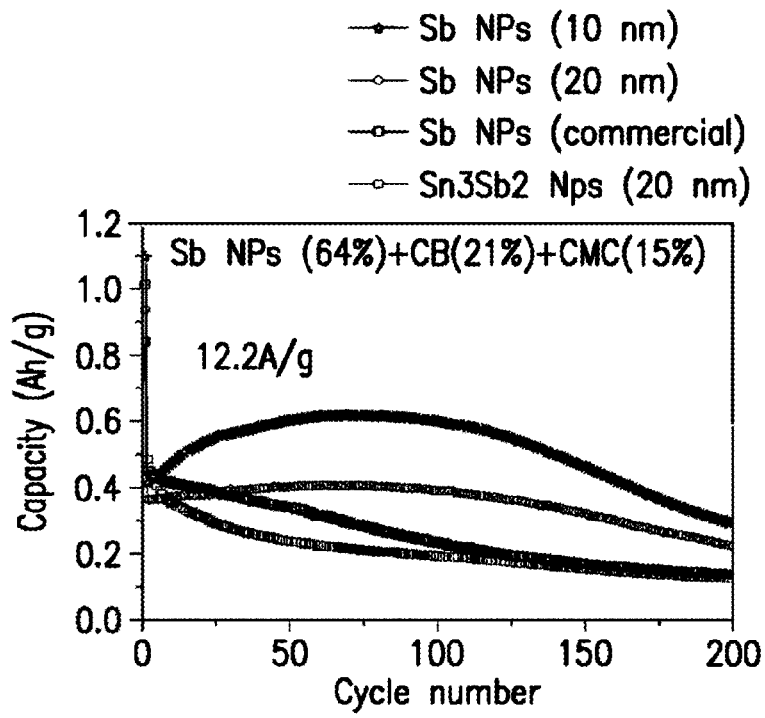

FIGS. 13C, D, E show cyclic stability of synthesized Sb, SnSb and commercial Sb NPs at different current densities. As it can be seen from the figure, at very low currents (FIG. 13C), the capacity level of all Sb NPs is lower than for SnSb NPs with excellent capacity retention over 100 cycles even for commercial antimony. However at higher currents (4.8 and 12.2 A/g), cyclic stability is different. 10 nm Sb NPs have showed the best cyclic stability in comparison with 20 nm and commercial Sb NPs.

Figure 13F:
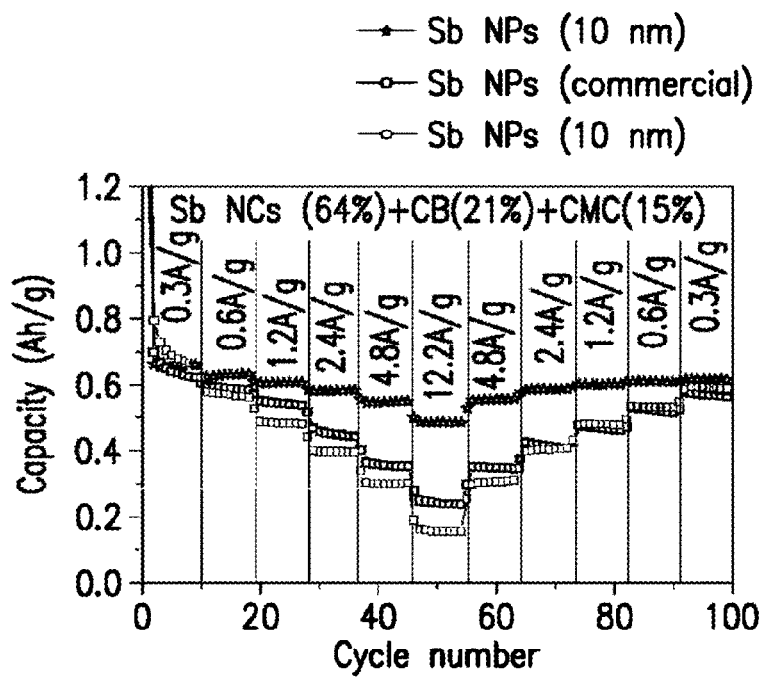
FIG. 13F Rate capability of Sb based electrodes at different current densities; all measurements performed in Li-batteries.

More detailed picture of capacity retention at different current densities is shown on the Fig. 13F. At low current densities (up to 0.6 A/g) capacity is similar for all samples. However, the difference could be seen at higher current density. The higher is current density, the bigger is difference. Thus, small Sb NPs have strong advantage in term of using them at high current densities. Decreasing of Sb NPs size can drastically improve stability of Sb based anode at high discharge-charge rates. The best results of the cyclic stability were obtained for 10 nm NPs which are inch better than commercial Sb NPs and the results reported so far in the literature. 10 nm Sb NPs can be considered as alternative anode materials to Sn and Si or as an additive to improve cyclic stability of last ones at high charge-discharge rates.

Na-Ion Batteries

Figure 14A:
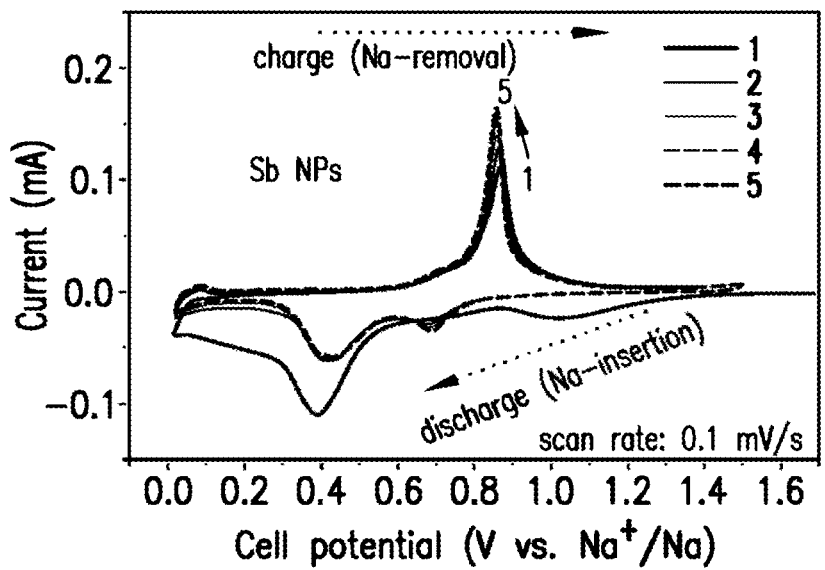
FIG. 14A CVs for the initial five charge-discharge cycles for electrode containing 10 nm Sb NPs (scan rate=0.1V/s)

FIG. 14A shows the cyclic voltammogram for the first five cycles obtained for Sb NPs. During the first discharge cycle a peak in the range of 1.0 V is observed, which can be assigned to the formation of the SEI. Sodiation takes place below 0.7 V with the main sodiation process at 0.4 V. For the second and subsequent cycles a second peak at 0.7 V appears. These two peaks can be assigned to the formation of NaSb and Na3Sb phases according to the reaction scheme:

$$Sb+Na^++e^- \rightarrow NaSb \quad (3)$$

$$NaSb+2Sb+2Na^++2e^- \rightarrow Na_3Sb \quad (4)$$

For the desodiation reaction one peak at 0.9-0.8V appears, which involves the reformation of the Sb NPs.

Figure 14B:
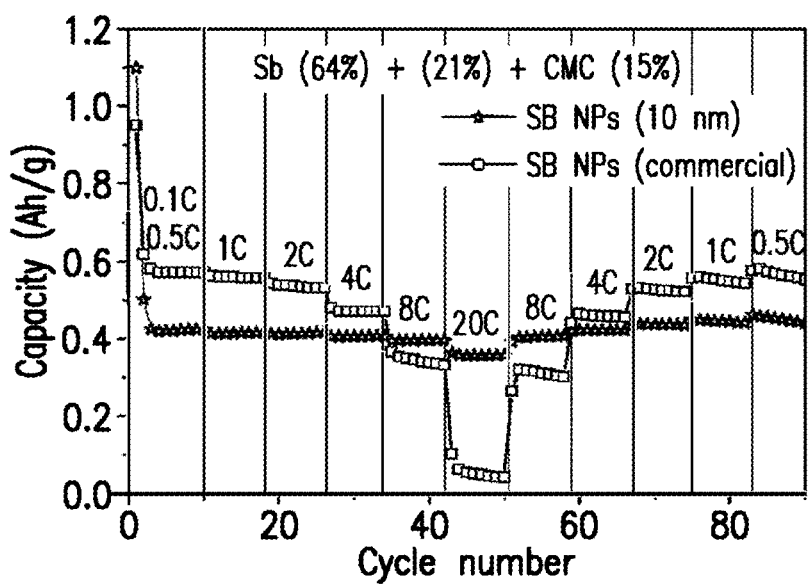
FIGS. 14B and 14C Rate capability of Sb based electrodes at different current densities; all measurements performed in Na-batteries.
Figure 14C:
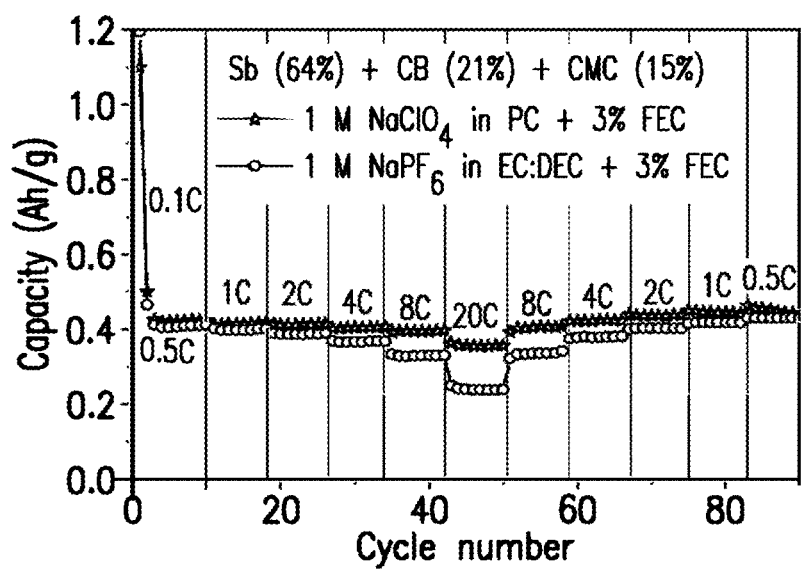

FIG. 14B shows the electrochemical performance of electrodes composed of either 10 nm Sb NPs or commercial Sb cycled galvanostatically at different C-rates. For electrodes based on commercial Sb at low currents capacities close to the theoretical maximum at 660 mAh/g were obtained. However, with increasing C-rate the capacities drop significantly below 100 mAh/g. In striking contrast to that electrodes composed of 10 nm Sb NPs show excellent rate capability with capacities above 300 mAh/g even at 20C. The fact that electrodes based on 10 nm Sb NPs show do not reach capacities close to the theoretical maximum even at low currents is most likely an intrinsic property of the NPs, since the same observation was made using 1 M $NaPF_6$ in EC:DEC (1:1) instead of 1 M $NaClO_4$ in PC (FIG. 14C).

Conclusions

Sb has considerably higher theoretical gravimetric storage capacity (660 mAh $g^{-1}$) [4] than graphite. There is no substantially important difference in the volumetric charge-storage capacity: 1890 mAh $cm^{-3}$ for Sb, 2200 mAh $cm^{-3}$ for Si and 2000 mAh $cm^{-3}$ for Sn, still much higher than that of Graphite (843 mAh $g^{-1}$). From economic view-point based on the raw material costs Sb is viable for large-scale battery production.

Electrochemical performance, in terms of cycling stability and rate-capability, of Na-ion cells is as good as for Li-ion cells, despite the fact that sodiation leads to much greater volumetric changes. As a main conclusion, 20 nm Sb NCs exhibit an overall much better performance as compared to bulk Sb and 10 nm Sb NCs, with the greatest difference seen for Na-ion cells for which 20 nm Sb exhibit up to 20% higher capacities as compared to 10 nm NCs. With capacity retention of at least 80% at high current rates of 20C, nanoscopic Sb electrodes is possibly the best-performing Na-ion anode material, and is comparable to fastest Li-intercalation materials such as graphite and lithium titanate.

REFERENCES

[1] Palacin, M. R. *Chem. Soc. Rev.* 2009, 38, 2565.
[2] Goodenough, J. B.; Kim, Y. *Chem. Mater.* 2009, 22, 587.
[3] Hayner, C. M.; Zhao, X.; Kung, H. H. Annual Review of Chemical and Biomolecular Engineering 2012, 3, 445.
[4] Park, C.-M.; Kim, J.-H.; Kim, H.; Sohn, H.-J. *Chem. Soc. Rev.* 2010, 39, 3115.
[5] Zhu, Y.; Han, X.; Xu, Y.; Liu, Y.; Zheng, S.; Xu, K.; Hu, L.; Wang, C. *ACS Nano* 2013, 7, 6378.
[6] Magasinski, A.; Dixon, P.; Hertzberg, B.; Kvit, A.; Ayala, J.; Yushin, G. *Nat. Mater.* 2010, 9, 353.
[7] Chockla, A. M.; Klavetter, K. C.; Mullins, C. B.; Korgel, B. A. *Chem. Mater.* 2012, 24, 3738.
[8] Kovalenko, I.; Zdyrko, B.; Magasinski, A.; Hertzberg, B.; Milicev, Z.; Burtovyy, R.; Luzinov, I.; Yushin, G. *Science* 2011, 333, 75.
[9] Beattie, S. D.; Larcher, D.; Morcrette, M.; Simon, B.; Tarascon, J. M. *Journal of the Electrochemical Society* 2008, 155, 158.
[10] Chan, C. K.; Peng, H.; Liu, G.; McIlwrath, K.; Zhang, X. F.; Huggins, R. A.; Cui, Y. *Nat. Nanotech.* 2008, 3, 31.
[11] Mosby, J. M.; Prieto, A. L. *J. Am. Chem. Soc.* 2008, 130, 10656.
[12] Alcantara, R.; Jiménez-Mateos, J. M.; Lavela, P.; Tirado, J. L. *Electrochemistry Communications* 2001, 3, 639.
[13] Klavetter, K. C.; Wood, S. M.; Lin, Y.-M.; Snider, J. L.; Davy, N. C.; Chockla, A. M.; Romanovicz, D. K.; Korgel, B. A.; Lee, J.-W.; Heller, A.; Mullins, C. B. *Journal of Power Sources* 2013, 238, 123.
[14] Komaba, S.; Matsuura, Y.; Ishikawa, T.; Yabuuchi, N.; Murata, W.; Kuze, S. *Electrochemistry Communications* 2012, 21, 65.
[15] Ge, P.; Fouletier, M. *Solid State Ionics* 1988, 28-30, Part 2, 1172.
[16] Cao, Y.; Xiao, L.; Wang, W.; Choi, D.; Nie, Z.; Yu, J.; Saraf, L. V.; Yang, Z.; Liu, J. *Adv. Mater.* 2011, 23, 3155.
[17] Wang, L.; Lu, Y.; Liu, J.; Xu, M.; Cheng, J.; Zhang, D.; Goodenough, J. B. *Angew. Chem. Int. Ed.* 2013, 52, 1964.
[18] Park, C.-M.; Yoon, S.; Lee, S.-I.; Kim, J.-H.; Jung, J.-H.; Sohn, H.-J. *Journal of The Electrochemical Society* 2007, 154, A917.
[19] Caballero, Á.; Morales, J.; Sánchez, L. *Journal of Power Sources* 2008, 175, 553.
[20] Sung, J. H.; Park, C.-M. *J. Electroanal. Chem.* 2013, 700, 12.
[21] Park, C.-M.; Sohn, H.-*J. Chem. Mater.* 2008, 20, 3169.
[22] Darwiche, A.; Marino, C.; Sougrati, M. T.; Fraisse, B.; Stievano, L.; Monconduit, L. *J. Am. Chem. Soc.* 2013, 135, 10179.
[23] Baggetto, L.; Ganesh, P.; Sun, C.-N.; Meisner, R. A.; Zawodzinski, T. A.; Veith, G. M. *Journal of Materials Chemistry A* 2013, 1, 7985.
[24] Qian, J.; Chen, Y.; Wu, L.; Cao, Y.; Ai, X.; Yang, H. *Chem. Commun.* 2012, 48, 7070.
[25] Zhou, X.; Dai, Z.; Bao, J.; Guo, Y.-G. *Journal of Materials Chemistry A* 2013, 1, 13727.
[26] Talapin, D. V.; Murray, C. B. *Science* 2005, 310, 86.
[27] Law, M.; Luther, J. M.; Song, Q.; Hughes, B. K.; Perkins, C. L.; Nozik, A. J. *J. Am. Chem. Soc.* 2008, 130, 5974.
[28] Zhang, H.; Hu, B.; Sun, L.; Hoyden, R.; Wise, F. W.; Muller, D. A.; Robinson, R. D. *Nano Lett.* 2011, 11, 5356.
[29] Hewitt, K. C.; Beaulieu, L. Y.; Dahn, J. R. *Journal of the Electrochemical Society* 2001, 148, A402.
[30] Wang, J.; Raistrick, I. D.; Huggins, R. A. *Journal of the Electrochemical Society* 1986, 133, 457.

What is claimed is:

1. An antimony based anode material for a rechargeable battery, the anode material comprising nanoparticles of composition $SbM_xO_y$, where M is an element selected from the group consisting of Sn, Ni, Cu, In, Al, Ge, Pb, Bi, Fe, Co, and Ga, with $0<x<2$ and $0 \leq y \leq 2.5+2x$, wherein the nanoparticles are monodisperse nanocrystals of $SbM_xO_y$ having an average size between 5 nm and 30 nm and a size deviation not exceeding 15%.

2. The material according to claim 1, wherein the nanoparticles are coated with a capping species.

3. The material according to claim 1, wherein the nanoparticles are composed of $SbSn_x$.

4. The material according to claim 3, wherein x is 1.5.

5. The material according to claim 1, wherein the average size of the nanoparticles is between 10 nm and 25 nm.

6. The material according to claim 5, wherein the average size of the nanoparticles is between 15 nm and 25 nm.

7. The material according to claim 1, wherein the full width at half aximum (FWHM) of a size distribution of the average size is below 11%.

8. The material according to claim 1, wherein the full width at half maximum (FWHM) of a size distribution of the average size is below 10%.

9. The material according to claim 1, wherein the full width at half maxinmm (FV/FIM) of a size distribution of the average size is in a range of 7% to 11%.

10. The material according to claim 1, wherein the full width at half maximum (FWHM) of a size distribution of the average size is in a range of 7% to 10%.

11. A rechargeable battery comprising an anode and a cathode, the anode comprising an antimony based anode material, which comprises nanoparticles of composition $SbM_xO_y$, where M is an element selected from the group consisting of Sn, Ni, Cu, In, Al, Ge, Pb, Bi, Fe. Co, and Ga, with $0<x<2$ and $0 \leq y \leq 2.5+2x$, wherein the nanoparticles are monodisperse nanocrystals of $SbM_xO_y$ having an average size between 5 nm and 30 nm and a size deviation not exceeding 15%.

12. The rechargeable battery according to claim 11, wherein said battery is a sodium battery or a lithium ion battery.

13. The material according to claim 1, wherein the nanoparticles are substantially spherical.

14. The material according to claim 1, wherein the nanoparticles have centrosymmetric polyhedral shapes.

* * * * *